(12) United States Patent
Leon

(10) Patent No.: US 8,544,420 B2
(45) Date of Patent: Oct. 1, 2013

(54) PERSONAL CARRIER-MOUNTED DOG LEASH WITH DISTAL STIFFENER

(75) Inventor: Michael A. Leon, Orlando, FL (US)

(73) Assignee: Leon Engineering Inc., Orlando, FL (US)

( * ) Notice: Subject to any disclaimer, the term of this patent is extended or adjusted under 35 U.S.C. 154(b) by 0 days.

(21) Appl. No.: 13/375,900

(22) PCT Filed: Aug. 5, 2010

(86) PCT No.: PCT/US2010/044559
§ 371 (c)(1),
(2), (4) Date: Dec. 2, 2011

(87) PCT Pub. No.: WO2011/017527
PCT Pub. Date: Feb. 10, 2011

(65) Prior Publication Data
US 2012/0118245 A1    May 17, 2012

Related U.S. Application Data

(60) Provisional application No. 61/273,514, filed on Aug. 5, 2009.

(51) Int. Cl.
*A01K 29/00* (2006.01)
(52) U.S. Cl.
USPC ........................................... 119/771
(58) Field of Classification Search
USPC ............... 119/771, 769, 772, 780, 784, 703, 119/704; 280/288.4, 204, 292
See application file for complete search history.

(56) References Cited

U.S. PATENT DOCUMENTS

| | | | | |
|---|---|---|---|---|
| 4,134,364 A * | 1/1979 | Boncela | ......................... | 119/703 |
| 4,854,269 A * | 8/1989 | Arntzen | ......................... | 119/703 |
| 5,033,409 A * | 7/1991 | Sabot | ............................. | 119/703 |
| 5,215,037 A * | 6/1993 | Allred | ............................. | 119/771 |
| 5,375,561 A * | 12/1994 | Gundersen | .................... | 119/771 |
| 5,632,233 A * | 5/1997 | Kovach | ......................... | 119/771 |
| 5,842,445 A * | 12/1998 | Barbour | ........................ | 119/771 |
| 6,135,059 A * | 10/2000 | Brock | ............................ | 119/702 |
| 6,148,772 A * | 11/2000 | Keyek-Frannsen | .......... | 119/771 |
| 7,013,840 B2 * | 3/2006 | Leon | ............................. | 119/771 |
| 8,006,650 B2 * | 8/2011 | Tollman | ........................ | 119/771 |
| 2005/0005876 A1 * | 1/2005 | Calvi | ............................ | 119/771 |
| 2005/0022752 A1 * | 2/2005 | Leon | ............................. | 119/771 |
| 2005/0034685 A1 * | 2/2005 | Chen | ............................ | 119/771 |

* cited by examiner

*Primary Examiner* — T. Nguyen
(74) *Attorney, Agent, or Firm* — Allen, Dyer, Doppelt, Milbrath & Gilchrist, P.A.

(57) ABSTRACT

A dog leash having a stiffener and a mast, the latter connected to a clamp by a flexible coupling. Moored to the clamp by a cord, the stiffener protrudes outwardly from the mast's end distal from the clamp. Built up by encasing a cord segment and the base of a clip in a semi-rigid plastic sheath, the stiffener directly links the clip to the mast. Because, in use, the stiffener and the clip ride attached to the dog's collar without slapping or flopping around randomly so as to confuse the animal, the leash can transmit nonverbal communication free of extraneous signals from the user of a personal carrier to a tethered dog. The dog can be then trained quickly and easily controlled, making possible the leash's use not only on bicycles but also, once they have been retrofitted with a universal mounting bracket, on wheelchairs and other personal carriers.

22 Claims, 15 Drawing Sheets

PERSONAL CARRIER-MOUNTED DOG LEASH WITH DISTAL STIFFENER

CROSS-REFERENCE TO RELATED APPLICATION

This application is the §371 National Stage of International Application No. PCT/US2010/044559, filed on Aug. 5, 2010, which claims the benefit of U.S. Provisional Application Ser. No. 61/273,514 filed on Aug. 5, 2009, the contents of which are herein incorporated by reference in their entirety.

FIELD OF THE INVENTION

The present invention relates generally to personal carrier-mounted dog exercising devices.

BACKGROUND OF THE INVENTION

Except for dog leashes mounted on bicycles, personal carrier-mounted dog exercising devices are unknown in the prior art. Bicycle-mounted dog leashes, on the other hand, have been around for decades. By using them, dog owners can save time: the bicyclist can gain sufficient exercise for both himself and his pet without his having to expend extended periods of time in the process, as is required of those who exercise their dogs by walking, for example.

In addition, a user reduces the hazards to which he might otherwise be exposed if he were simply pedaling a bicycle in the customary manner but with a dog's leash attached to the handlebars or to another portion of the bicycle frame or else holding the leash in one hand as he pedaled. Nevertheless, for every one of these earlier bicycle-mounted devices, only able-bodied persons are in a position to actually benefit from its use. Moreover, those who are able-bodied need to possess a remarkably high degree of athleticism. Not only must they be capable of riding a two-wheeled bicycle but also they must be able to maintain their balance and a reasonable level of control when a dog is tethered to the bicycle.

Past efforts directed toward reducing hazards for both the bicyclist and his dog have focused on providing the tethered animal with as much freedom of motion, and as great a range across which to move, as possible, while at the same time keeping the dog away from the bicycle's wheels. To meet these objectives, each prior art bicycle-mounted dog leash has included an outwardly projecting rigid structure and, attached thereto, an elongated, flexible strap which gives the tethered dog ample amounts of slack.

Unfortunately, these earlier devices whether mounted high on a bicycle frame and just behind the bicycle seat, as taught by Allred in U.S. Pat. No. 5,215,037, which issued Jun. 1, 1993, or lower down on the frame, as taught by Leon in U.S. Pat. No. 7,013,840, which issued on Mar. 21, 2006, have, because of their respective strap and the slack it provides, catered to the dog's natural tendency to pull on its leash.

Indeed, the tethered dog, and especially one that is trying its best to follow the bicyclist's lead, will pull on the flexible strap in an attempt to eliminate any slackness in it and thereby gain a better sense, through direct physical contact, of the direction in which the bicyclist wishes to head. Eliminating this slackness helps the dog because a taut strap cannot generate the slapping noises and other extraneous signals which a slack strap makes, all of which tend to confuse a tethered dog as it seeks to gain direction-giving information from the bicyclist.

Not only has the bicyclist had to compensate for the dog's natural tendency to pull on a leash, but also he has had to be ready, in an instant, to check certain erratic behavior patterns which dogs are known to exhibit. An episode of erratic behavior, such as one in which a large dog suddenly lunges sideways, could result in the tethered animal destabilizing both the bicycle and its rider, tipping them over, and injuring the bicyclist and his dog in the process.

Recognizing that a generally well-behaved dog may indulge in erratic behavior on occasion, Leon offered a bicycle-mounted dog leash designed to reduce the likelihood that a dog tethered with it could tip over a bicycle. In this prior art leash, a clamp—the only element connecting it to the bicycle frame—is attached to the bicycle's rear wheel support structure downwardly of its rear wheel axle. With the clamp so attached, the tipping moment between the point where the leash is connected to the frame and the point of contact of the bicycle's rear wheel with the ground is kept to a minimum. As a result, a sharp sidewise pull by a tethered animal tends to slide the bicycle sideways rather than tipping it over.

Turning to biomechanics, Leon was able to reduce the tipping forces further by incorporating into this same prior art leash a rigid, semi S-shaped mast. In practice, this further reduction is accomplished by adjusting the overall height of the mast during installation. Specifically, the end of the mast distal from the clamp is brought, as Leon teaches in U.S. Pat. No. 7,013,840, into a position in which this end is disposed at a height which approximates that of the dog's shoulder. With the mast's end so positioned and with the dog tethered to it by a flexible strap, the animal automatically lowers its head as it pulls sidewise, thus reducing its pulling ability.

While this prior art leash, with its mast properly adjusted, does reduce the tethered dog's pulling ability, a would-be user still needs to possess a high degree of athleticism. The bicyclist has to be able to control his bicycle whenever the dog opts to pull on the flexible strap and in whatever direction it pleases the animal to pull at any given moment.

Not surprisingly, no one in the prior art has suggested any version of a dog leash mounted on a wheelchair or the like, even though such a device could provide a handicapped person with a dog's much-needed companionship or assistance. Exactly how a mobility-impaired user can keep a wheelchair with a dog tethered to it under control at all times has remained, until now, a major stumbling block to the development of a wheelchair-mounted dog exercising device.

SUMMARY OF THE INVENTION

An object of the present invention is to provide a dog leash which can be mounted on a personal carrier such as a wheelchair, a power chair, an adult tricycle, or the like and which, when the personal carrier is being moved about, affords the tethered dog with sufficient freedom of motion that it can walk or run in view beside the rider and then trail behind as needed to avoid obstacles, and which still allows a handicapped occupant to keep the personal carrier under control at all times.

A further object of this invention is to provide a personal carrier-mounted dog exercising device which not only can feed a tethered animal, without his having to pull on a flexible strap or the like, clear, nonverbal direction and speed control commands from the carrier's occupant but also eliminates extraneous signals originating with the motion of the dog himself as he runs, such as the slapping of a slack strap or the rattling of a clip attached thereto.

A still further object of this invention is to provide a dog exercising device which can be quickly attached, without the use of tools, to the frame of nearly all personal carriers, such as bicycles, adult tricycles, wheelchairs, power chairs, Segways® and the like, without modifying the carrier and which, during installation, can be readily adjusted to accommodate the tethered dog according to its size.

The improved dog leash comprises a clamp, a flexible coupling, a hollow, rigid, semi S-shaped mast, and an elongated cord, as well as a stiffener which is built up on a leading segment of the cord and which protrudes outwardly from the mast's outer end. The clamp anchors the dog leash to the carrier's frame near a low point thereon or, alternately, to a universal mounting bracket attachable to the frame. Juxtaposed between the clamp and the mast's inner end and fixedly attached to each of them is the flexible coupling. From it, the mast extends outwardly, arching upwardly to the stiffener. The latter, which is moored within the mast's outer end by the cord and connected by it to an ear-like member of the clamp, terminates, outside of the mast, in a clip fastenable to a standard dog collar or harness.

Preferably fabricated of a hollow core, braided polypropylene cord or the like which, after being first inserted into a sleeve, looped with it through the clip's base, and next fed into the hollow core of the cord's leading segment through a slit formed therein, with the cord so fed emerging distal from the slit at the leading segment's end, is then encased, once portions of the sleeve and of the cord proximate with the clip have been coated with a hot melt glue-type adhesive, in a semi-rigid plastic sheath shrink-fitted onto the core-filled leading segment, the stiffener forms a built-up span which, in use, links the mast to the clip. Alternately, this built-up span can be fitted by encasing the leading segment in resilient polyurethane or the like or attached directly to the mast.

Not only is the stiffener thus fabricated stiff enough that, unlike the flexible straps of the prior art, it cannot flop about and make slapping noises, but also the stiffener immobilizes the clip's base so that it cannot move from side to side independently of the cord's leading segment. With its base so held, the clip can no longer rattle or otherwise generate dog-distracting chatter, including that set in motion by the tethered dog's own exertions.

Nevertheless, the stiffener is sufficiently flexible that it can be bent downwardly whenever the tethered animal wishes to sniff or lower its head for some other purpose. Moreover, the stiffener must bend first, ahead of the flexible coupling and its juncture with the mast, so that the mast's outer end, whenever the stiffener is so bent, can be kept at approximately the dog's shoulder height. Otherwise, if the coupling were to flex in such a way as to drop the mast, the dog could step over it. Then each time the dog lowered his head, a handicapped rider could find herself having to stop the personal carrier and have someone reposition the animal on the outside of the mast.

An installer can adjust the height of the mast's outer end to accommodate a particular dog by varying the angle at which the clamp is attached, whether onto the carrier's frame or onto the universal mounting bracket, or, alternately, by rotating the flexible coupling. In the latter situation, a quick-drying release agent is preferably used to free the flexible coupling which, in assembled relation with the clamp, is force-fitted onto the ear-like member thereof. The flexible coupling, once rotated to properly position the mast's outer end, is then held immobile until the release agent dries, locking in the desired adjustment.

Properly mounted relative to one or the other of a tethered dog's shoulders, the mast's outer end, with the stiffener protruding therefrom—whether it is fully extended or in a bent or curved condition, can then be used as a prod for automatically applying a gentle push to a sensitive area near the shoulder, prompting the dog to turn away from the personal carrier whenever its occupant begins to turn toward the animal. Alternately, in the case of a very large dog that stands, at shoulder height, well above the mast's outer end, the stiffener itself can be used as a prod for gently pushing against the dog's rib cage and urging him to turn away as needed.

If instead of initiating a turn toward the dog, the occupant of the personal carrier opts to turn it away from the tethered animal, the carrier will automatically apply a gentle tug, transmitted through the stiffener to his collar or harness, again prompting the dog to change direction in sync with the carrier and its occupant.

Spacing the tethered animal so that he cannot get in front of the personal carrier's wheels may require the installer to shorten the length of that portion of the stiffener which protrudes from the mast's outer end. When the clip disposed at the end of the stiffener is one which does not swivel, such as a carabineer-type fastener, the stiffener can be shortened by repeatedly twisting said protruding portion. Keeping the shortened stiffener from un-twisting is also readily accomplished: one simply attaches the clip to the tethered dog's collar or harness.

Alternately, in those cases in which the dog leash is to be dedicated for use with a particular dog and personal carrier combination, this shortening can be accomplished by pulling an additional length of the elongated cord out of the mast's inner end, as well as out of the flexible coupling joined thereto, cutting excess cord, tieing the shortened cord onto the clamp's ear-like member, and then force-fitting the ear-like member and the cord tied thereto into the flexible coupling.

A shortened stiffener is preferably used not only when the overall length of the personal carrier is such that a dog could get himself in front of the carrier's wheels but also in situations in which the clip is attached to a dog's harness—usually at a point further back on the animal than if he were wearing a collar. In use, the length of that portion of the stiffener which protrudes from the mast's outer end varies widely. Fully extended, this protruding portion preferably measures when the personal carrier in use on a typical bicycle, for example, up to 25.4 cm (10 inches) in length; but when twisted or otherwise shortened, it can be as short as 7.6 cm (3 inches).

The flexible coupling between the clamp and the mast, like the one disclosed earlier by Leon, allows the mast to move, relative to its juncture with the flexible coupling, through an angle of approximately 180 degrees between the carrier's forward and aft directions. This flexibility, coupled with that of the stiffener, greatly reduces the chance of injury to the animal even if he were to go around the opposite side of a tree or pole from the personal carrier and brings himself to a sudden stop.

While the clamp, which employs only two mating elements preferably held together in assembled relation by bolts and hand tightened nuts, is mounted directly on the frame of a bicycle, such an approach cannot be used in the case of many other personal carriers. Wheelchairs, power chairs, adult tricycles, shopping carts for the handicapped, and Segway® personal mobility devices, for example, all lack structural members which are so positioned that one could fixedly attach the clamp to them and then have the mast properly deployed for use in the improved dog leash. In order to compensate for this lack of clamp-friendly structural members, the universal mounting bracket is so designed that it can be readily attached to the respective frames of most personal carriers without modifying them.

The universal mounting bracket includes a pair of channel sections which are U-shaped in transverse cross-section but of unequal length. The flanges of each channel section, as well as the web of the shorter one, define cutouts which, when the bracket is mounted in use, may be occupied by parts of the personal carrier's frame, depending upon which one of several widely varying types of carriers is involved at the time. In addition, the web of each channel section defines a series of holes some of which are preferably square in shape. The square-shaped holes are alignable between the channel sections in such a way that at least one of the flanges of the shorter channel section nests within the longer one whenever the paired channel sections are held together in assembled relation by at least one pair of bolts and their respective nuts, each bolt being inserted into an opposing pair of alignable holes.

For most personal carriers onto which the universal mounting bracket is attached in use, the clamp is preferably mounted proximate with the aft end of the longer channel section. In such cases, at least one of the channel sections is fixedly attached to the carrier's frame; and both of them are deployed, facing each other and fastened together with bolts and hand tightened nuts threadedly engageable therewith. Extended rearwardly of the carrier, the aft end of the longer channel section provides a mount for the clamp spaced well back of the carrier's wheels. Spacing the tethered dog in the heel position is particularly important in the case of the Segway®; and this mount, spaced as it is behind and to the side of the carrier, helps to insure that the animal is kept from getting in front of its wheels.

BRIEF DESCRIPTION OF THE DRAWINGS

Further details are explained below with the help of the examples illustrated in the attached drawings in which.

DETAILED DESCRIPTION OF THE PREFERRED EMBODIMENTS

Figure 1:
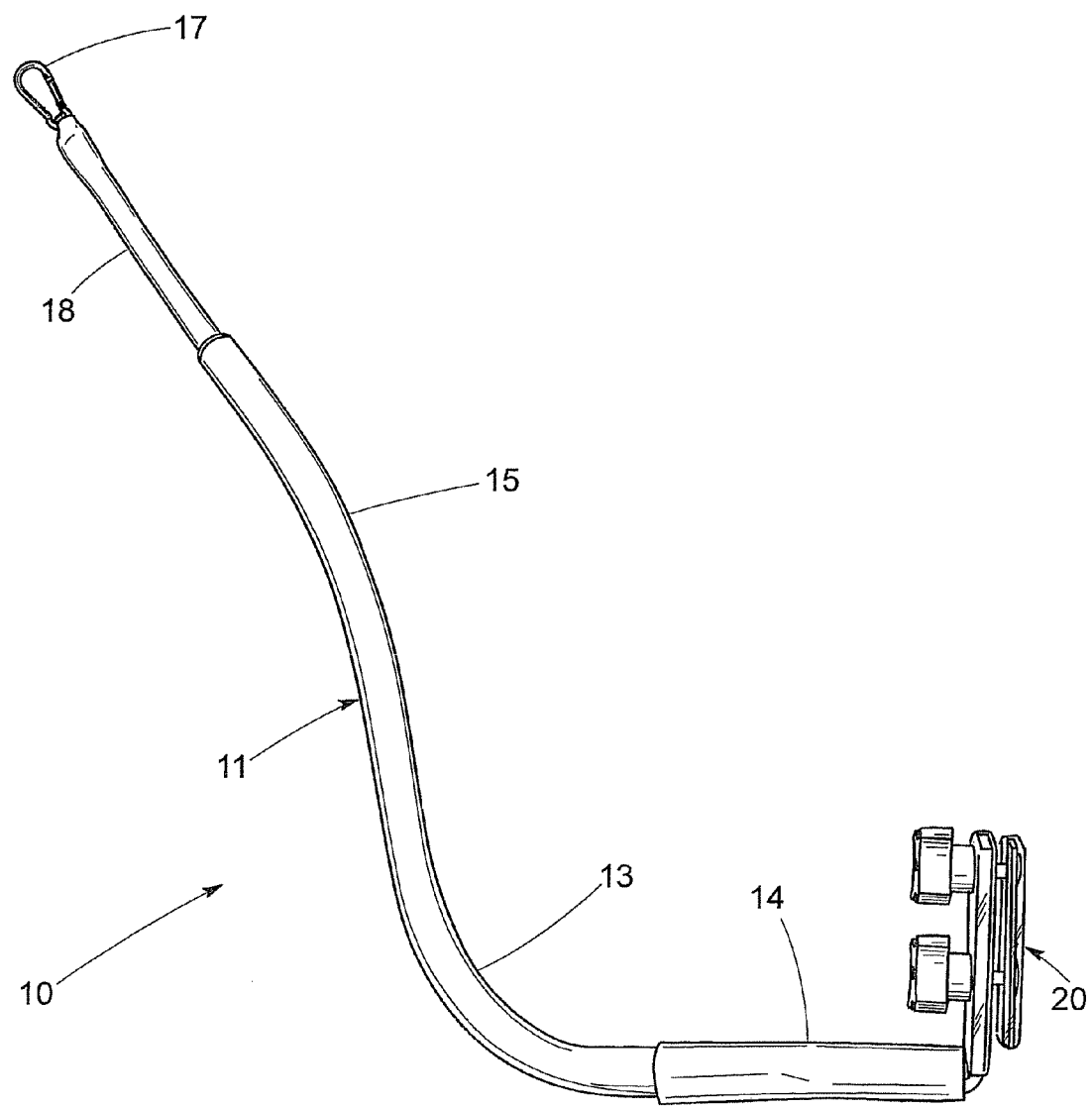
FIG. 1 is a perspective view of the personal carrier-mounted dog leash according to the present invention.

In the drawings and indicated generally, by the reference number 10 is a personal carrier-mounted dog leash according to the present invention. With it, a person can simultaneously exercise a dog and ride any one of a wide variety of personal mobility devices (PMDs), such as a bicycle, wheelchair, power chair, Segway®, or adult tricycle, on which the leash 10 is installed and to which the dog is tethered.

As illustrated in FIG. 1, the leash 10 comprises a device with a clamp 20, an open-ended, hollow mast 11, and a flexible coupling 14, juxtaposed between and attached to both the clamp and the mast, as well as a stiffener 18 which protrudes outwardly therefrom and terminates in a clip 17. Included in the leash's mounting structure, the clamp 20 is used, depending upon the frame of the personal carrier on which the leash is deployed, either singularly or in combination with a universal mounting bracket 40 (FIGS. 5-8).

Permanently affixed with the use of glue or the like to the flexible coupling 14, the mast 11 comprises a lightweight, rigid tube, preferably fabricated of 1.3 cm (½ inch) plastic pipe or made of steel or aluminum tubing. Alternately, the mast can be molded in such a way it is solid in transverse cross section.

Bent into an elongated, semi "S" shape, the tube defines spaced apart first and second bends 13, 15 (FIG. 1). The bends 13, 15 curve away from each other and are disposed along arcs which subtend angles of about 90 degrees and of about 15 degrees, respectively.

Force-fitted onto the clamp's ear-like member 31, the flexible coupling 14, in assembled relation with the mast 11, flexibly connects the latter to the clamp 20. The flexible coupling 14 is sufficiently flexible that it can be bent through an angle of about 180 degrees and, in combination with the mast 11, allows a tethered dog freedom to move forward and aft about the ear-like member 31. In the preferred embodiment, the flexible coupling 14 measures, by way of example, 15 cm (6 inches) in length and has an inner diameter of 2 cm (¾ inch).

Preferably, the mast's outer end, when the leash 10 is in use, can move over an area which extends at least 0.5 m (1¾ feet) forward and aft from the ear-like member 31 and up to 0.6 m (2 feet) in a direction parallel to the longitudinal centerline of the unflexed hose segment 14, while at the same time keeping the mast's outer end away from the side of the personal carrier on which the leash is mounted. With this degree of flexibility in the position of the mast's outer end, certain advantages are realized: first, the tethered animal is kept at a safe distance from the personal carrier as it is being moved about; and second, he can trail behind the carrier as needed to avoid obstacles. But in the event the dog were to go around the opposite side of a tree or pole from that chosen by the carrier's occupant and an abrupt stoppage were to occur, the animal would still be protected from sudden jerks on the mast 11 because of the shock absorption capacity inherent in the flexible coupling between the mast and the clamp 20.

Figure 2:
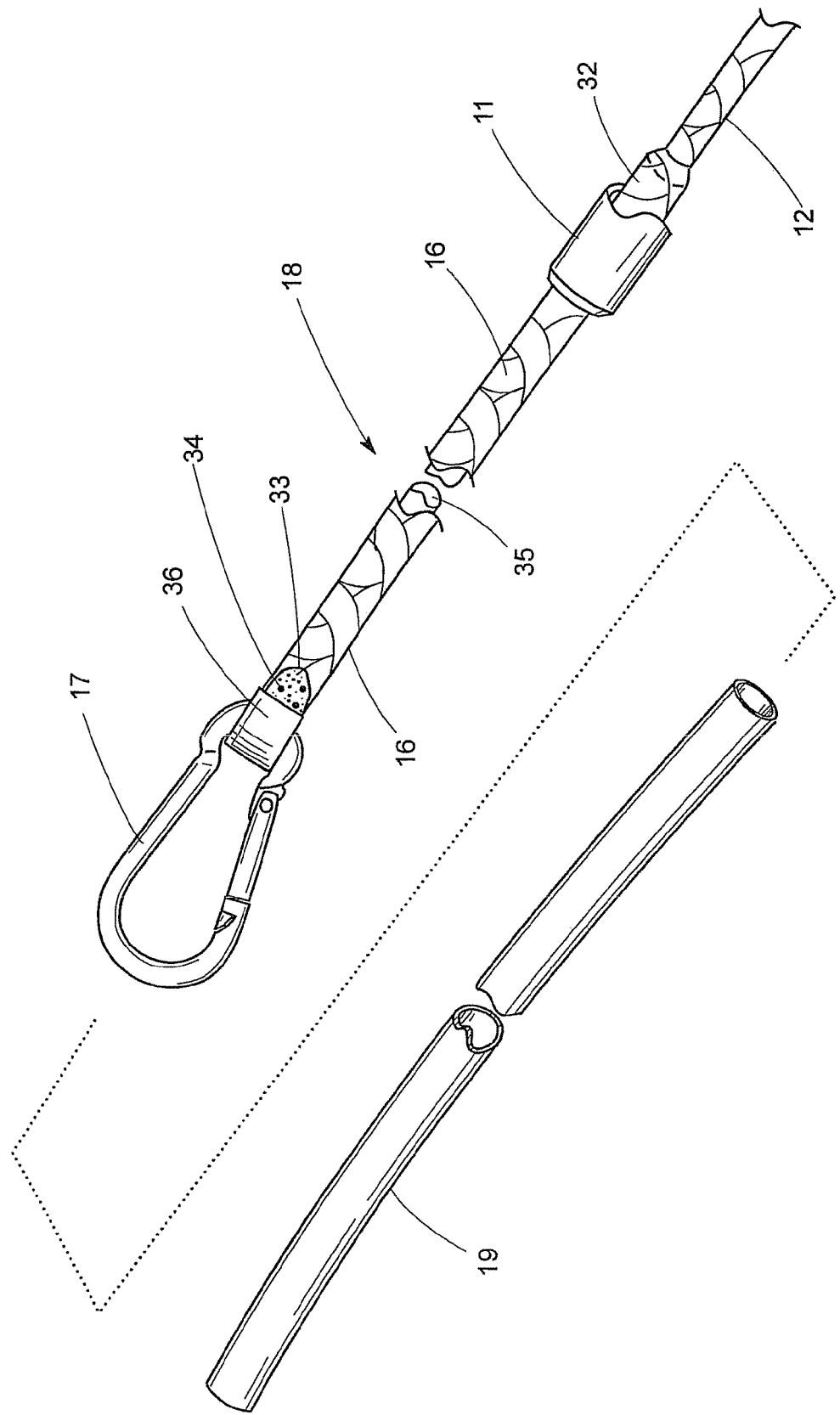
FIG. 2 is an exploded perspective view, on an enlarged scale, of fragmentary portions of the outer end of the dog leash according to FIG. 1.
Figure 3:
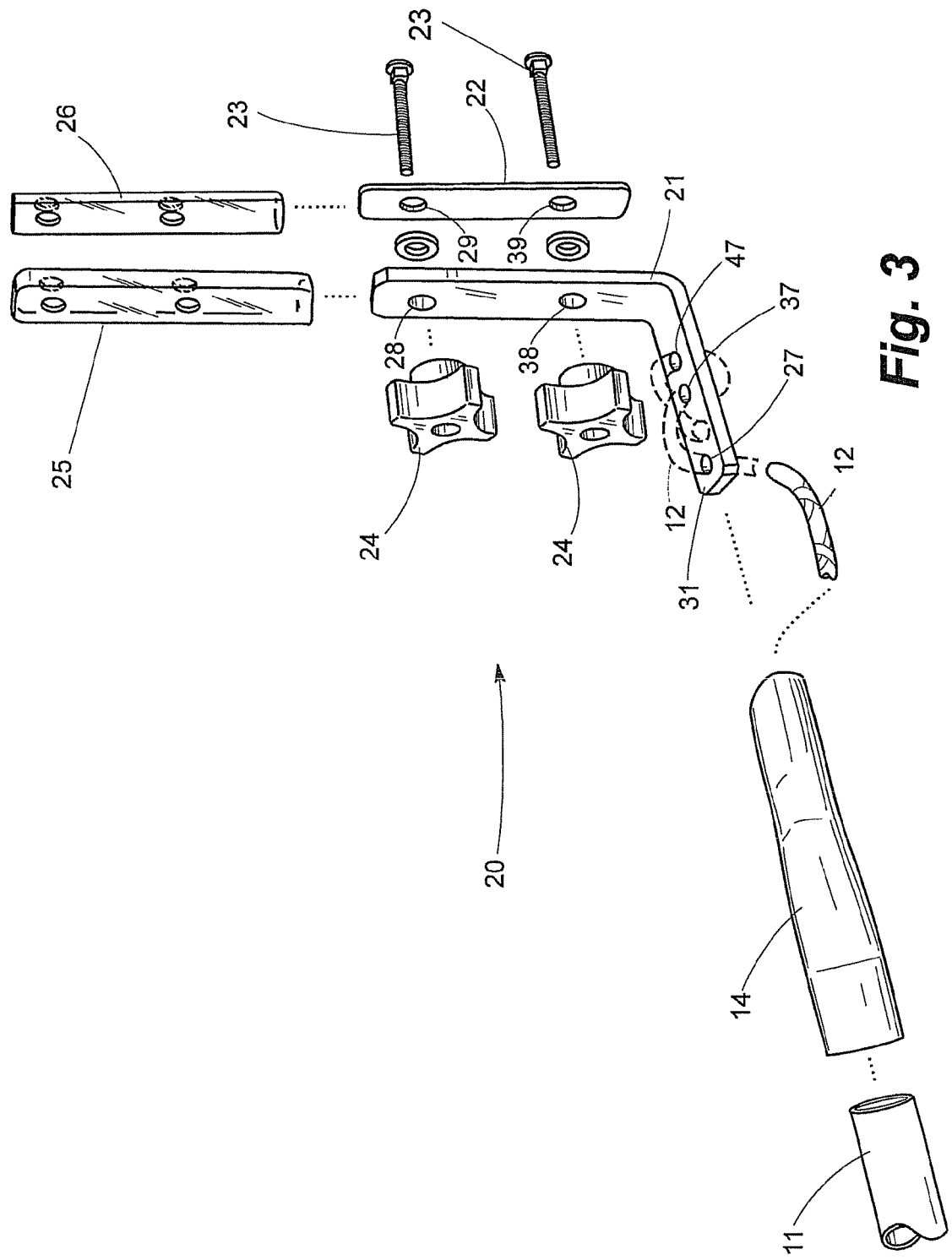
FIG. 3 is an exploded perspective view, on an enlarged scale, of the inner end of the dog leash according to FIG. 1, showing the clamp, the flexible coupling, and fragmentary portions of the mast and of the elongated cord, and showing as well, in dashed lines, the configuration of the cord when it is tied to the ear-like member of the clamp prior to the flexible coupling being force-fitted thereon.

Moored within the outer end of the mast 11 by a cord 12 anchored to the clamp 20, the stiffener 18 preferably comprises the cord's leading segment 16, a nylon sleeve 36, and a semi-rigid plastic sheath 19 which encases both the leading segment and the sleeve (FIGS. 1-3). In the preferred embodiment, the stiffener 18 is built-up from a portion of a hollow core, braided polypropylene cord 12 or the like using a multistep fabrication process.

In this fabrication process, the cord 12 is first inserted into the sleeve 36 and then threaded with it through an open loop defined by the clip 17. Next, the end of the cord 12, which, in the assembled leash 10, is used for anchoring the stiffener 18, is fed into the hollow core of the leading segment 16 through a slit 33 formed therein; and upon completion of this step, cord which remains within the leading segment's hollow core becomes a permanent filler 35 for core-filled segment 32 (FIG. 2). Once portions of the sleeve 36 and of the filler 35 have been coated with a hot melt glue-type adhesive 34, and the sleeve positioned contiguous with the clip 17 so as to shield the cord should a tethered dog ever chew on the clip, the plastic sheath 19 is then shrink-fitted onto both the core-filled segment 32 and the sleeve, immobilizing the clip's base so that it cannot move from side to side independently of cord segment 32.

Not only does the stiffener 18 thus fabricated immobilize the clip's base relative to the cord segment 32 but also the stiffener cannot flop about and make slapping noises. Indeed, the stiffener 18 is stiff enough that it retains whatever shape into which it has been bent or curved until the stiffener is acted upon by forces which are at least as great in magnitude as those exerted by a tethered dog in the process of lowering his head. Nevertheless, the stiffener 18 must be sufficiently flexible that it bends first, ahead of the flexible coupling 14 and its juncture with the mast 11, so that the position of the mast's outer end, once set for a particular dog, can be maintained during normal use.

In the preferred embodiment, the stiffener 18 has an outer diameter of approximately 1 cm (⅜ inch); and the core-filled cord segment's outer diameter is approximately 0.8 cm (⁵⁄₁₆ inch). The closeness of the fit between the stiffener 18 and the mast 11 is preferably not an interference-type fit; but when such is desired, one can increase the thickness of the plastic sheath 19. The stiffener 18 is sufficiently long that it can protrude up to 25.4 cm (10 inches), when fully extended, from the mast's outer end. Tests have shown that when the dog leash 10 is mounted on a typical bicycle frame and used to tether a dog that stands, at his shoulder height, where most dogs stand, a stiffener 18 which can protrude as far as 25.4 cm (10 inches) keeps the animal in a safe position when he is running beside the bicycle.

Alternately, the stiffener's built-up span, which links the mast 11 to the clip 17 in use, can be fabricated by encasing the core-filled cord segment 32, with or without adhesive 34 applied to portions of the sleeve 36 and of the filler 35, in resilient polyurethane or the like.

In a further alternate embodiment, the stiffener's built-up span can be fabricated by encasing, either in the plastic sheath 19 or in resilient polyurethane or the like, the sleeve 35 and the cord's leading segment, which, prior to its being so encased, comprises a portion of the cord 12 disposed proximate with its mid-section. The leading segment itself is formed by threading the cord 12 first through the sleeve 36 and next, together with the sleeve, through the clip's open loop and then doubling the cord with its two free ends, back on itself. When fully extended distal from the sleeve 36, each of the free ends is substantially longer than the sheath 19. Once the leading segment, and more specifically, a portion of the cord which is disposed contiguous with the sleeve 36, is actually encased to form the stiffener's built-up span, both of the cord's free ends remain, connected to it. Held within the mast 11 in the assembled dog leash 10, either or both of the cord's free ends can be used to moor the stiffener 18 within the mast's outer end.

Preferably, the clip 17 is one which does not swivel, such as a carabineer-type fastener. With a swivel-free clip, the extent to which the stiffener 18 protrudes outwardly from the mast's outer end can be shortened by twisting the stiffener, while simultaneously twisting the cord 12, and can then be kept in a shortened state by attaching the clip to the tethered dog's collar or harness. Alternately, a clip having a swivel base and a hook with a spring-loaded latch, such as the one employed in Leon's prior art leash and disclosed in U.S. Pat. No. 7,013, 840, can be utilized. With a swivel-based clip, however, shortening the extent to which the stiffener 18 protrudes outwardly from the mast's outer end requires an installer to disassemble the leash 10, pull an additional length of the cord 12 out of the mast's inner end, and out of the flexible coupling 14 as well, cut excess cord from the cord's free end and tie it onto the clamp's ear-like member 31, and then force-fit the latter with the cord tied thereto 10 into the hose segment. Unfortunately, this shortening process, entailing as it does the cutting of the cord's free end, limits the uses to which a particular leash 10 with a stiffener 18, thus shortened, can be put. Alternately the stiffener can be anchored by securing the cords free end to the mast's inner wall or by affixing the stiffener to the masts outer end.

As illustrated in FIG. 3, the clamp's ear-like member 31 preferably defines a series of holes 27, 37, 47 through which an installer can lace the cord 12, forming a loop therein between outer holes 27, 37, and then pull the cord's free end back through this loop, cinching the cord in place in the process. With the cord 12 so anchored to the ear-like member 31, the dog remains tethered to the personal carrier even in the unlikely event the mast 11 were to separate from the flexible coupling 14 and/or the hose segment from the clamp 20. Alternately, the cord's free end can be secured to the mast's inner wall.

In the preferred embodiment, the clamp 20 includes two mating elements 21, 22, one of which is angled and defines the ear-like member 31. In addition, clamp element 21 preferably defines a first pair of holes 28, 38 which are spaced apart from each other by approximately the same distance as are those in a second pair of holes 29, 39 defined by clamp element 22, with each hole 28, 38; 29, 39 being sized to receive a bolt 23 (FIG. 3). Means for holding clamp elements 21, 22 in assembled relation comprises a pair of bolts 23 and hand tightened nuts 24, threadedly engageable therewith. Fabricated of aluminum or the like, the clamp elements 21, 22 are preferably covered with slip-on plastic sleeves 25, 26, respectively. The sleeves 25, 26 keep the clamp 20, when it is mounted directly onto a bicycle's frame or the like, from marring or otherwise damaging its paint finish.

Figure 4:
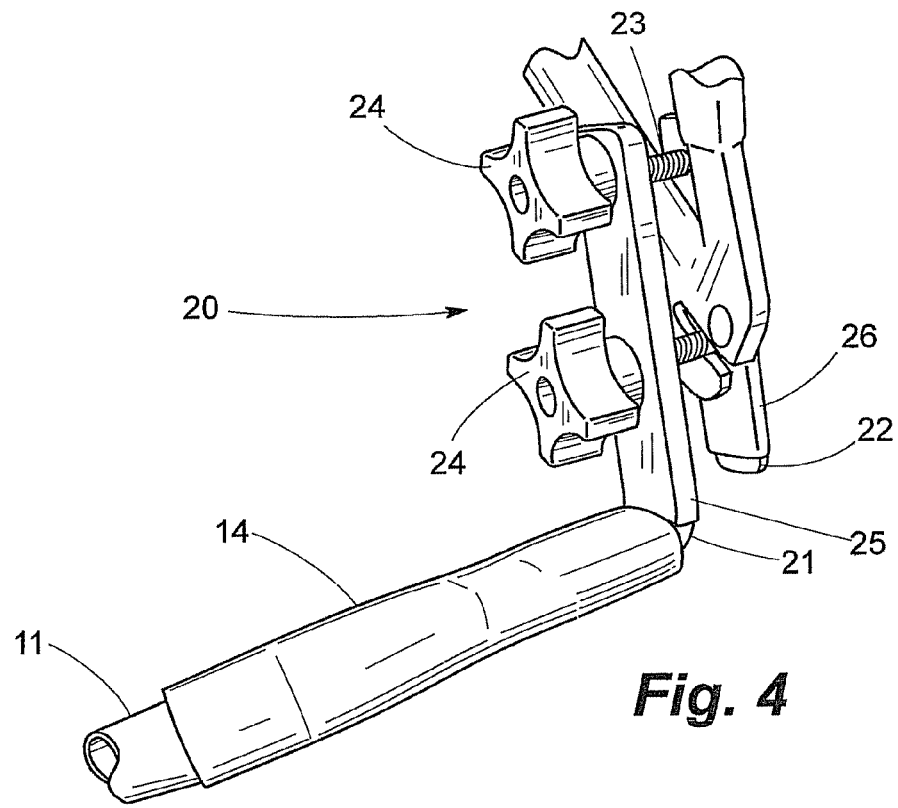
FIG. 4 is a perspective view, on an enlarged scale, of a fragmentary portion of the inner end of the dog leash according to FIG. 1, with the dog leash's clamp being shown mounted on a fragment of a bicycle's rear axle support structure.
Figure 5:
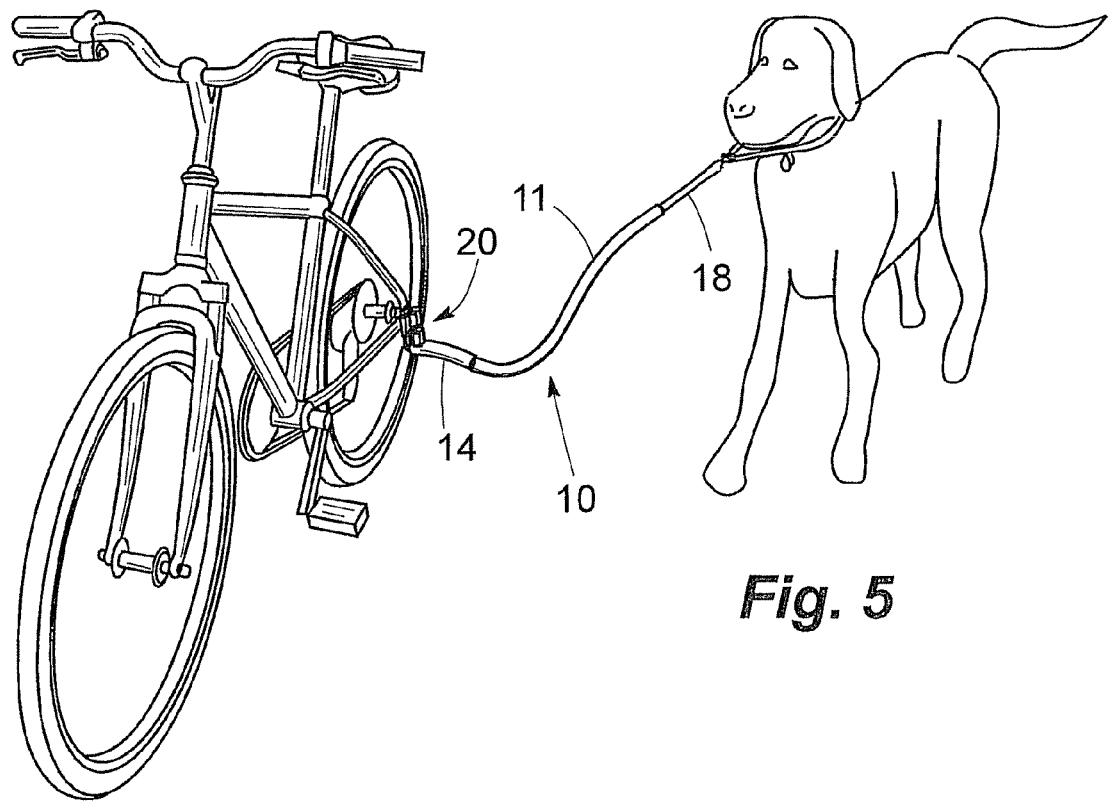
FIG. 5 is a perspective view of the dog leash according to FIG. 1, showing the dog leash's clamp mounted on a typical bicycle frame and its clip attached to a dog's collar.

Installation of the leash 10 on a bicycle can be accomplished in a relatively few steps. First, clamp element 22 is placed inside its frame close to the bicycle's rear axle, with bolts 23 protruding outwardly (FIG. 4). Next, clamp element 21, with its ear-like member 31 onto which the flexible coupling 14 has been previously force-fitted, is mounted onto the protruding bolts 23 and loosely fastened in place by hand tightening nuts 24. Then, the clamp 20 is rotated, as needed, to position the mast's outer end at its proper working height, which is at about the shoulder height of the dog to be tethered. Alternately, the hose segment 14, freed with the use of a quick-drying release agent such as alcohol, can be rotated about the ear-like member 31 and, once the mast's outer end is properly positioned, held immobile until the release agent dries, locking in the adjustment. Lastly, the nuts 24 are tightened.

Figure 8:
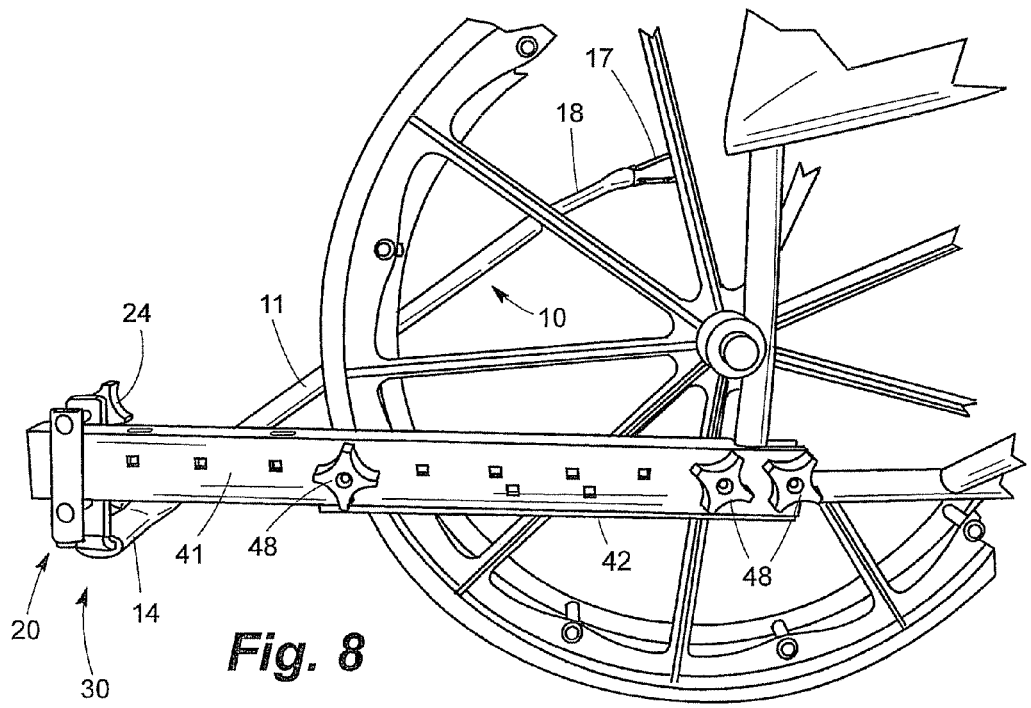
FIG. 8 is a side perspective view, on an enlarged scale and as seen from a vantage point between the wheelchair's two rear wheels, of the dog leash according to FIG. 6, the bracket being shown attached to a fragment of the wheelchair's frame.
Figure 9:
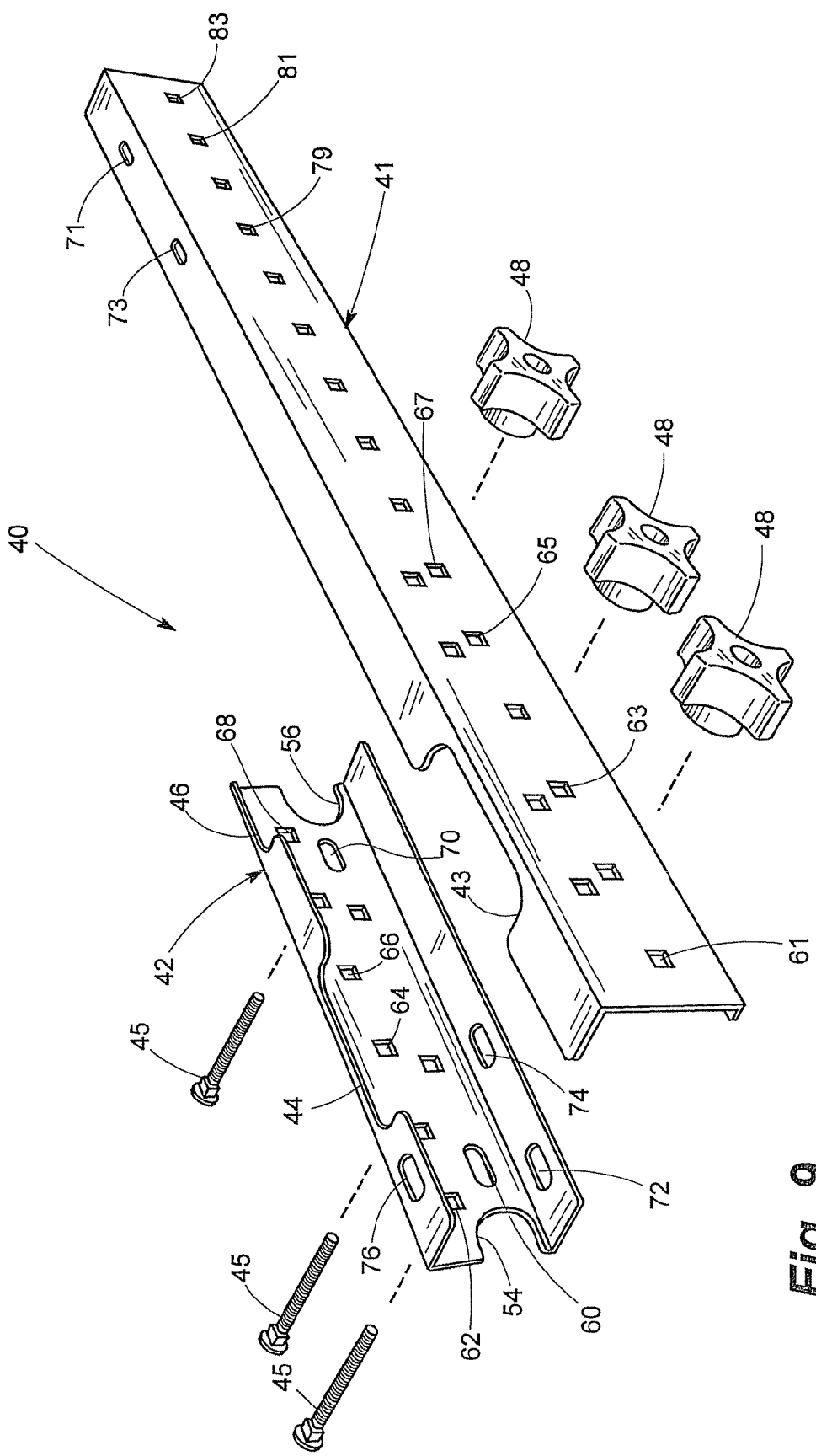
FIG. 9 is an exploded perspective view, on an enlarged scale, of the universal mounting bracket of the dog leash according to FIG. 6, the bracket being shown unattached to any personal carrier and without the clamp mounted thereon.
Figure 10:
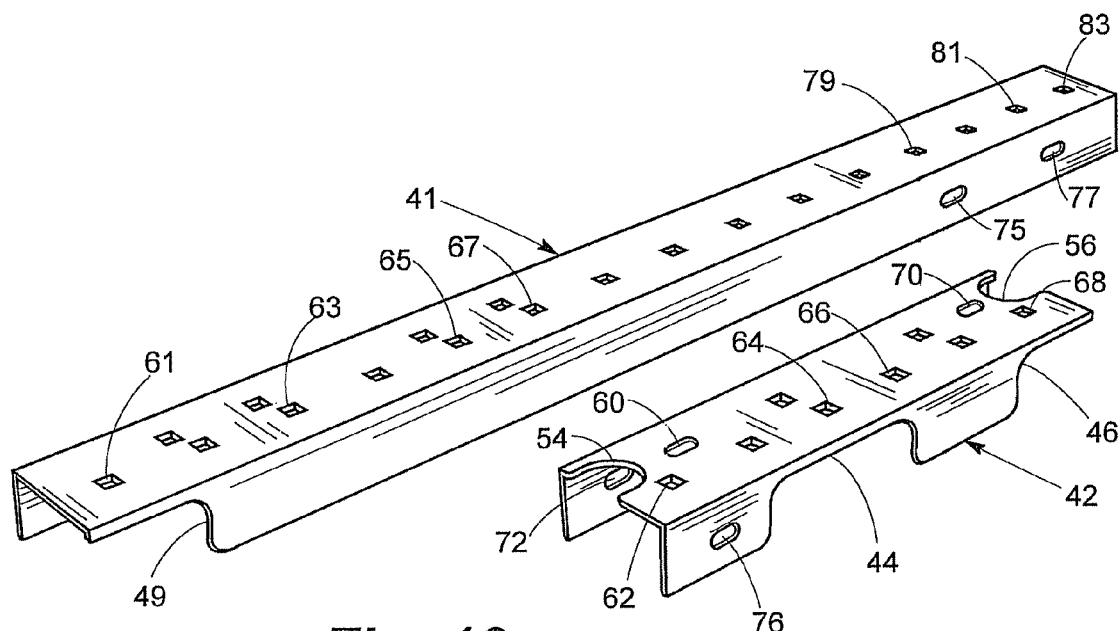
FIG. 10 is a further perspective view of the longer and shorter U-shaped channel sections in the bracket according to FIG. 9.
Figure 11:
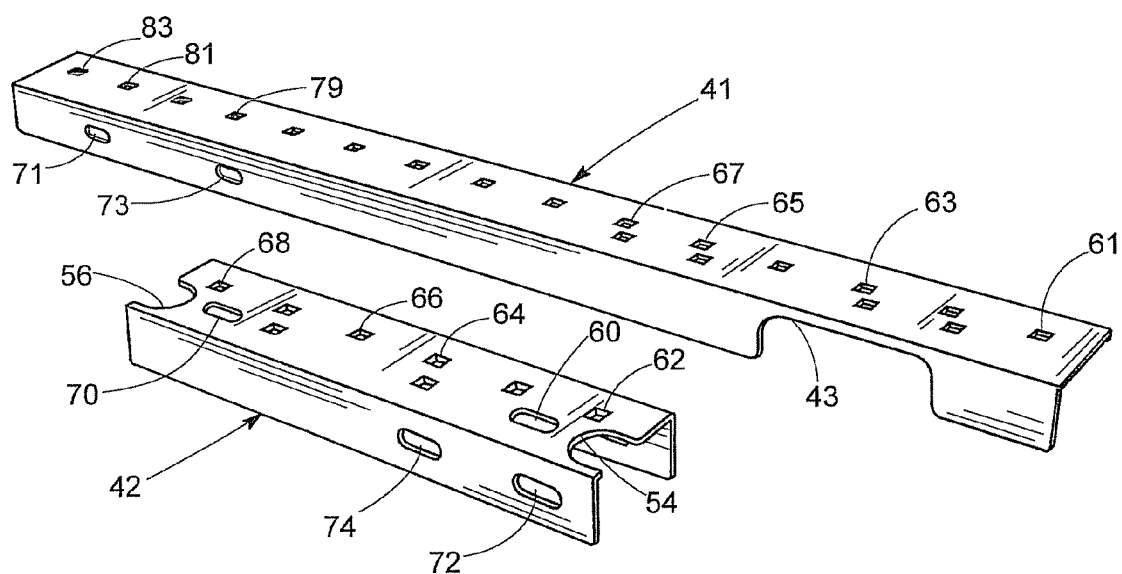
FIG. 11 is a still further perspective view of the longer and shorter U-shaped channel sections in the bracket according to FIG. 9.

In addition to those steps needed to mount the leash 10 on a bicycle's frame, installation of the leash on most other personal carriers requires a preparatory step in which an adaptor for the clamp 20 is first affixed to the carrier's frame. As illustrated in FIGS. 6-8 and 14-24, a first alternate embodiment of the leash, indicated generally by the reference number 30, comprises a leash 10 in combination with the universal mounting bracket 40. The universal mounting bracket includes a pair of channel sections 41, 42, each of which is U-shaped in transverse cross-section (FIGS. 9-11). In use, at least one of the channel sections 41, 42, with its longitudinal centerline disposed generally horizontally and its web oriented perpendicularly to the horizontal plane, is fixedly attached to the carrier's frame. Generally, whenever both channel sections 41, 42 are incorporated into the adaptor on which the clamp 20 is mounted, the clamp's mating elements, in assembled relation with the bracket 40, are pressed, respectively, against the web of the longer channel section 41 and against edges of its flanges disposed distal from the web and spaced apart therefrom.

Figure 22:
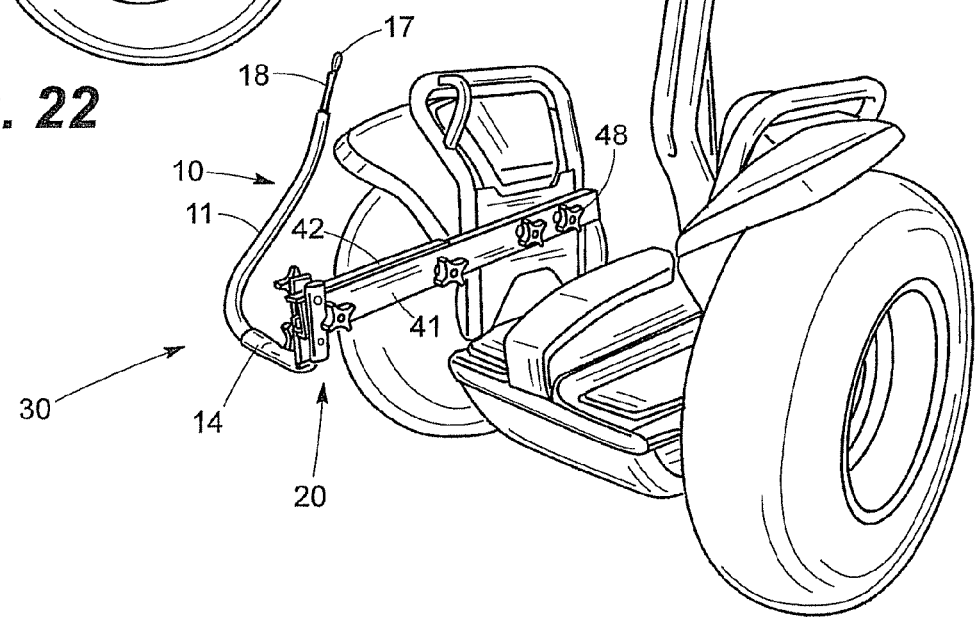
FIG. 22 is a side perspective view, on an enlarged scale, of the dog leash according to FIG. 20, with fragments of the personal mobility device being shown.
Figure 23:
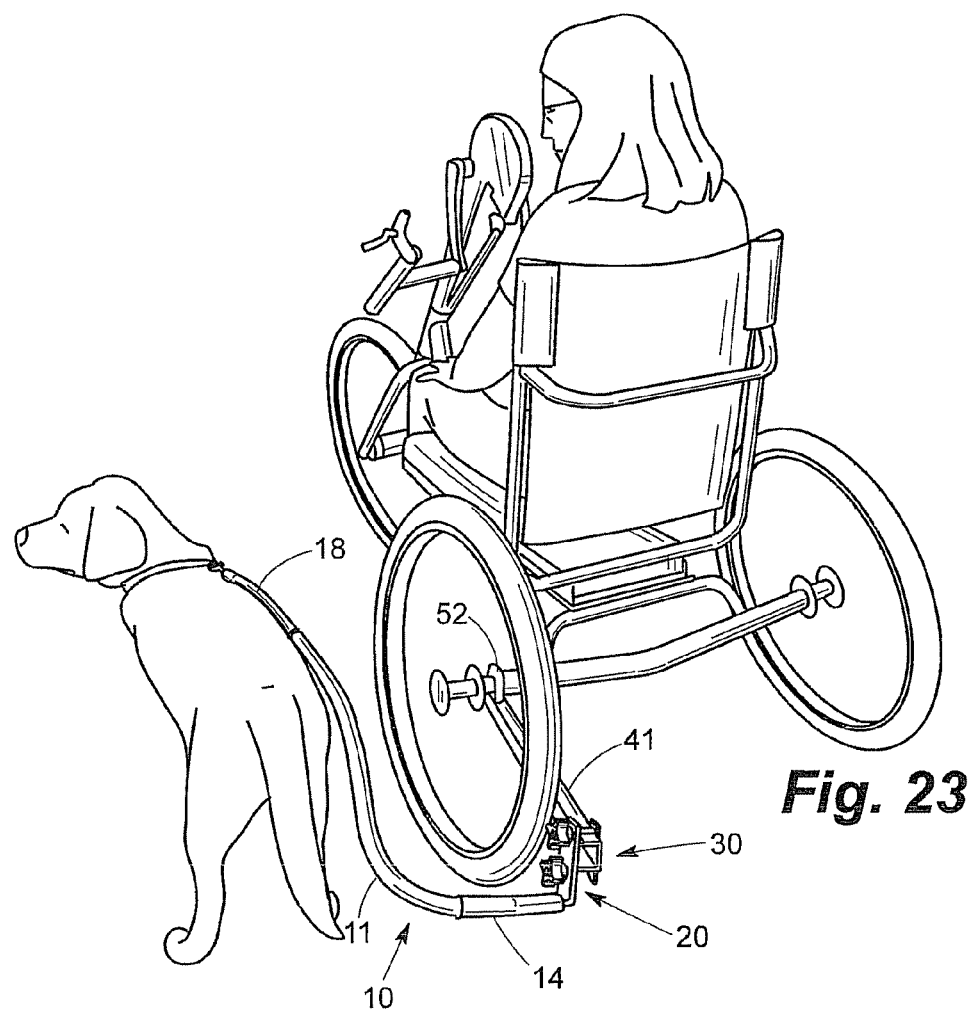
FIG. 23 is a rear perspective view of the first alternate embodiment of the dog leash according to FIG. 6, showing the bracket mounted, with the use of a U-bolt, beneath structure supporting the rear axle of an adult tricycle.
Figure 24:
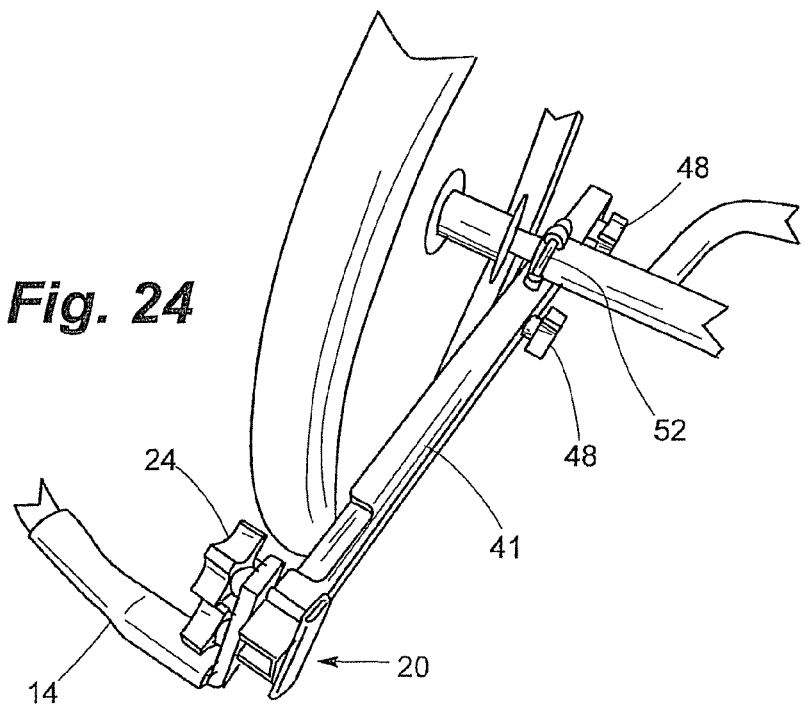
FIG. 24 is a rear perspective view, on an enlarged scale, of a fragmentary portion of the dog leash according to FIG. 23, showing the bracket and the U-bolt used in mounting it beneath the structure supporting the tricycle's rear axle, with fragments of the tricycle being shown.

In the leash 30, both of the bracket's U-shaped channel sections 41, 42 are incorporated into the adaptor; and the clamp 20 is mounted proximate with the aft end of the longer channel section 41, so that the clamp can be spaced rearwardly of the carrier's wheels. As shown in the drawings, the channel sections 41, 42 can be deployed together in three different basic configurations as follows:
1) Both channel sections form a clamp which presses against a structural member of the carrier's frame with the structural member being sandwiched between them (FIGS. 6-8 and 17);
2) One of the channel sections is first fixedly attached to the carrier's frame, and then the other channel section is affixed to the one already so attached (FIGS. 14-16 and 18-22); and
3) Both channel sections are clamped together and then attached as a unit to the carrier's frame (FIGS. 23-24).

Out of these three basic configurations, the one chosen for mounting the leash 30 onto a particular personal carrier must be compatible with the structural members present and their arrangement in the carrier's frame.

The channel members 41, 42, as illustrated in the drawings, are so designed that they can be deployed together in anyone of the three basic configurations and then redeployed in either one of the other two basic configurations merely by making changes in the number and/or type of mechanical fasteners, such as carriage bolts, U-bolts and their respective nuts, employed in mounting the leash 30. That is, the channel members 41, 42 preferably define the same holes, openings and cutouts, regardless of the configuration in which they are deployed.

As illustrated in FIG. 9, the web of each channel section 41, 42 defines a series of preferably square-shaped holes, including holes 61, 63, 65, 67, 79, 81, 83; and 62, 64, 66, 68, respectively, in which contiguous pairs of these holes are uniformly spaced apart along the length of each web and in which the holes are alignable between the channel sections. Means for retaining the channel sections 41, 42 in assembled relation within the mounting structure for the leash 30, regardless of the basic configuration in which they are deployed, includes mounting bolts 45 and hand tightened nuts 48 threadedly engageable therewith. Suitably sized, the head of each bolt 45, when the latter is a carriage bolt, is held, during installation, in a fixed position within one of the square-shaped holes defined by either channel section 41 or 42; and the respective shank of the bolt with its head so held is likewise held in a fixed position, so that an installer can easily turn the nuts 48 without turning the bolts.

Figure 16:
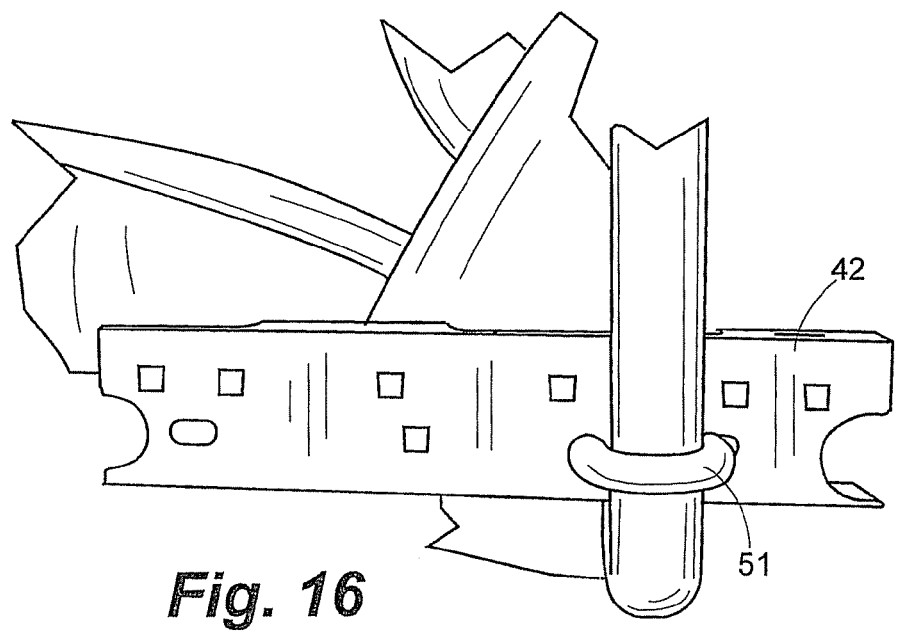
FIG. 16 is a side perspective view, on an enlarged scale, of the shorter U-shaped channel section and of the U-bolt used in attaching it, as part of the dog leash according to FIG. 14, to the second power chair's armrest support, with fragments of the second power chair and its armrest support being shown.

In addition, the web of each channel section 41, 42 preferably defines two pairs of holes which are disposed in a staggered array relative to the uniformly spaced apart, square-shaped holes. In the case of the shorter channel section 42, the holes in this staggered array which are disposed proximate with the distal ends of the channel section are preferably oval-shaped openings to accommodate variations in the positions of two bolts when they are threadedly engaged with holes present in the original, unmodified frame of a particular carrier, so that these two bolts can be used, in accordance with one of the three basic configurations listed hereinabove, to affix the shorter channel section to the frame (FIGS. 9-11 and 19). Alternately, when U-bolt 51 is used to affix the shorter channel section to a carrier's frame, a pair of holes which are contiguous with each other in the staggered array are employed to receive the U-bolt's dual shanks (FIG. 16).

With the exception of one flange in the shorter channel section 42 which defines a single oval-shaped opening 76 and a cutout 44 proximate therewith, each of the flanges in the channel sections 41, 42 defines a pair of spaced apart, oval-shaped openings 71, 73 and 77, 75; 72, 74, respectively. Not only are paired openings 71, 73 and 77, 75, which are disposed in opposing flanges of the longer channel section 41, aligned with each other and alignable with paired openings 72, 74 and opening 76 and cutout 44 in the shorter channel section's opposing flanges, but also the spacing between the two openings in each pair is such that they can simultaneously receive the dual shanks of U-bolt 52 when the latter is used to attach the channel sections 41, 42 as a unit to the carrier's frame (FIGS. 23 and 24).

Figure 6:
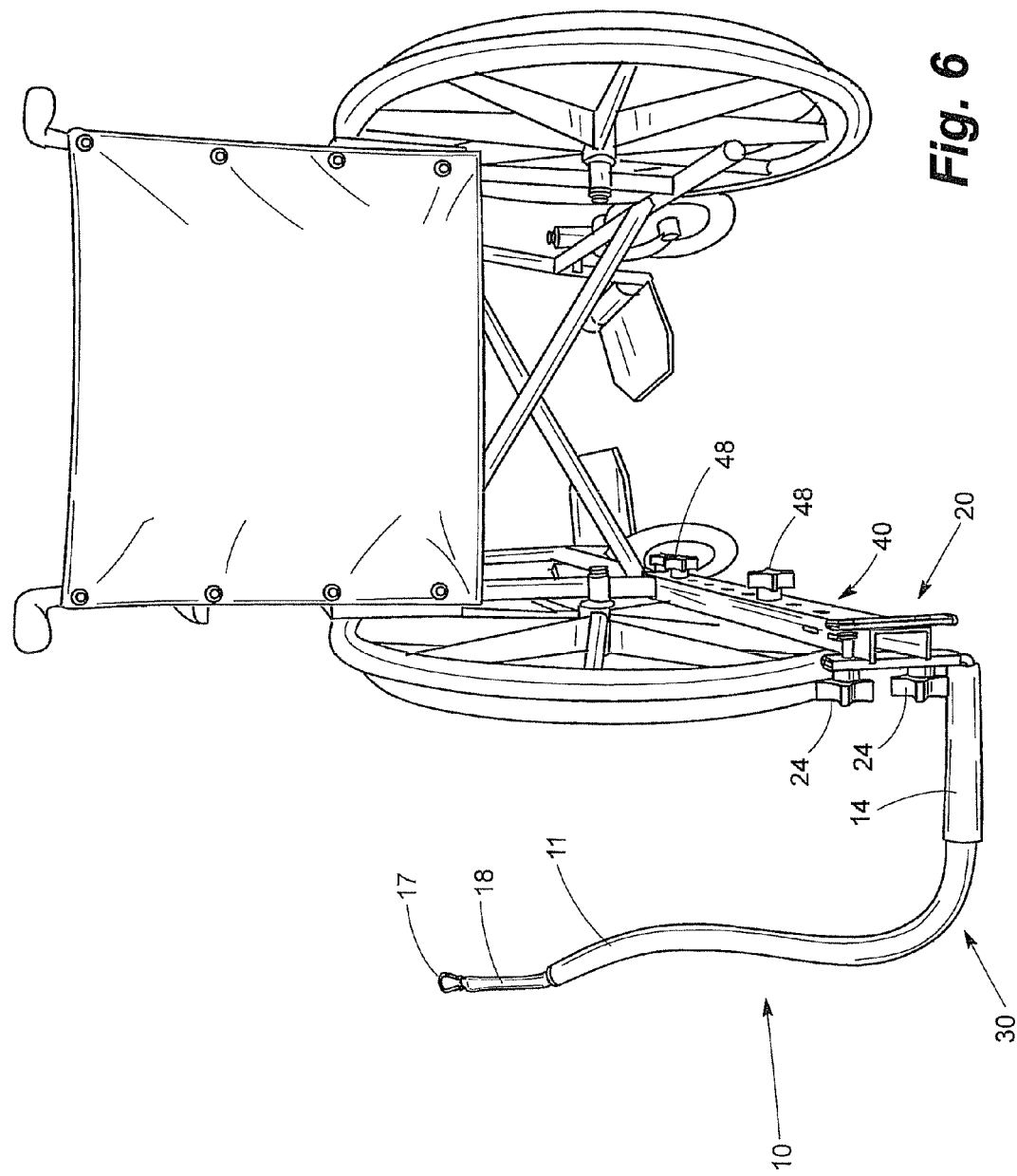
FIG. 6 is a rear elevation view of a first alternate embodiment of the personal carrier-mounted dog leash according to the present invention, the dog leash's mounting structure including both the clamp and the universal mounting bracket attached to the frame of a typical wheelchair.
Figure 7:
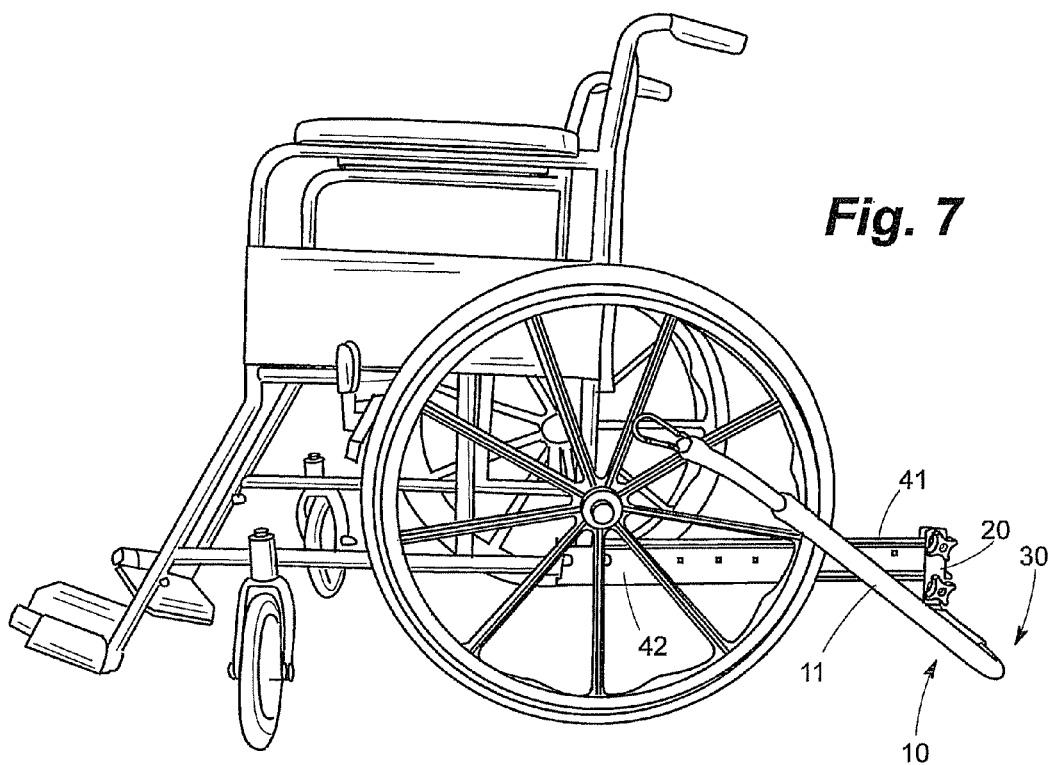
FIG. 7 is a side elevation view, on a reduced scale, of the dog leash according to FIG. 6, showing the clamp mounted on the aft end of the bracket which extends rearwardly of the wheelchair.

As is further illustrated in FIGS. 9-11, at least one flange of each channel section 41, 42 defines a cutout. Preferably, when the channel sections 41, 42 face each other and the flanges of one channel section overlap the other's, the two channel sections can be oriented in such a way that the cutouts 49, 46 in their respective flanges are disposed in alignment with each other, thereby creating a space which, depending upon a particular carrier's frame, may be occupied by one of its structural members. If, in addition, the channel sections 41, 42 can be clamped together so as to press against any structural member sandwiched between and occupying said space, then the two channel sections, clamped onto the structural member, can be used to mount the leash 30 on the carrier's frame (FIGS. 6-8).

Figure 17:
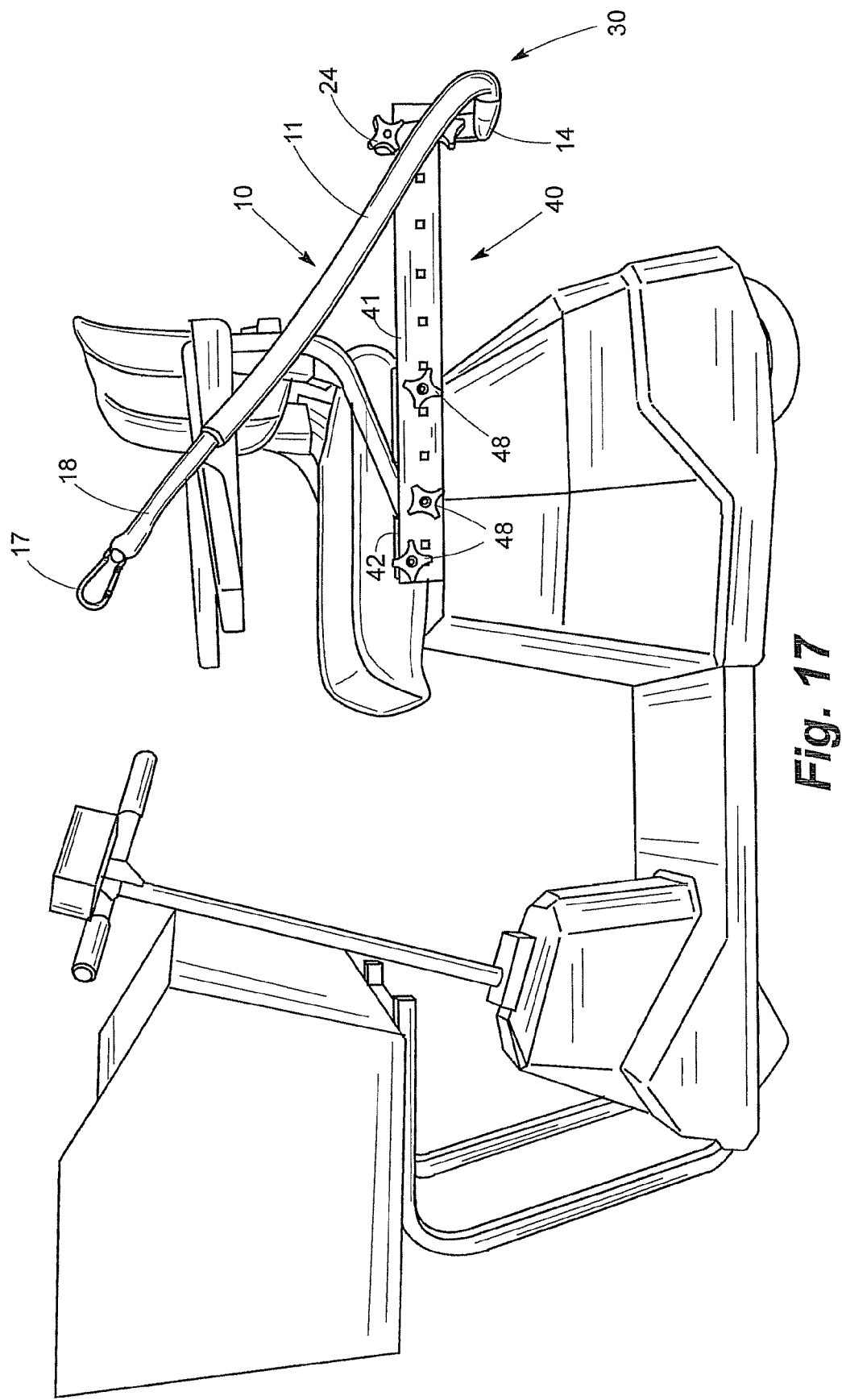
FIG. 17 is a side perspective view of the first alternate embodiment of the dog leash according to FIG. 6, showing the bracket attached to the frame of a third power chair.

Alternately, the flanges of the channel sections 41, 42 can be oriented in such a way that when the longer channel section's flange defining cutout 43 overlaps the shorter channel section's flange defining cutout 44, the cutouts 43, 44 are in alignment with each other, thereby creating yet another space which may be occupied by a structural member of a carrier having a distinctly different frame but one which the two channel sections 41, 42 can be clamped onto as well (FIG. 17). Further, a pair of cutouts 54, 56 disposed at the distal ends of the shorter channel section's web can be used to keep the shorter channel section from rotating while it and the longer channel section 41 are clamped onto the structural member occupying the space created by aligned cutouts 43, 44.

Figure 12:
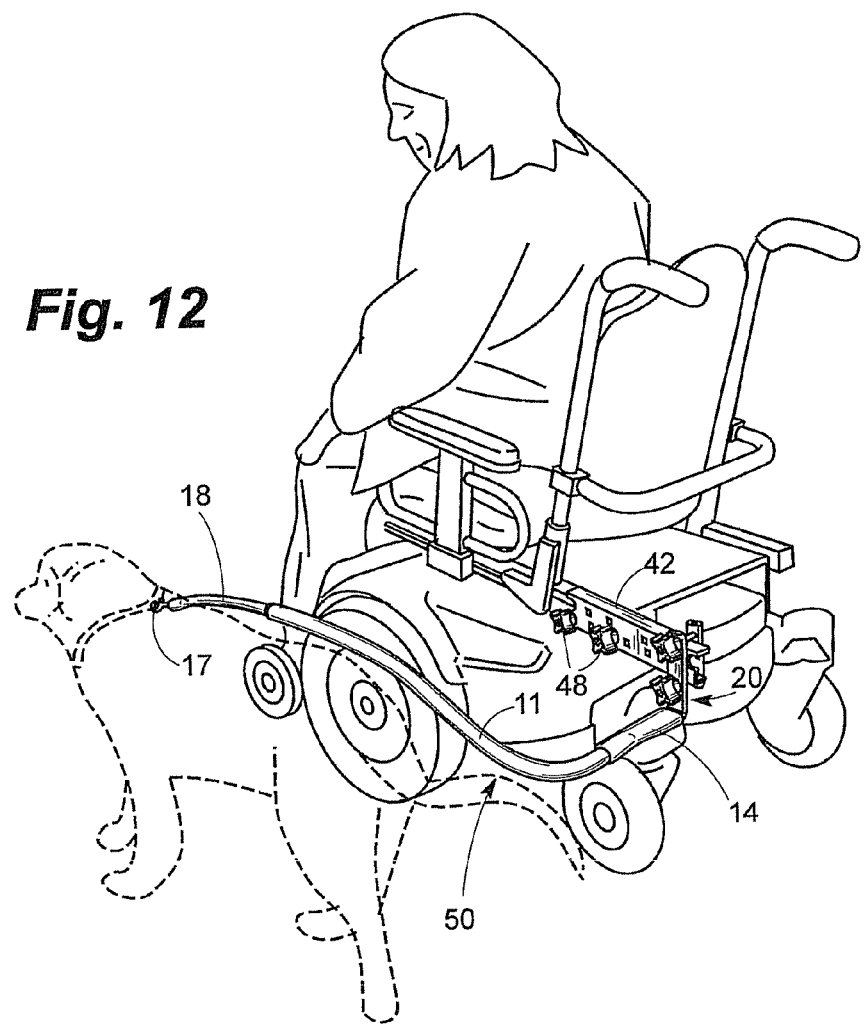
FIG. 12 is an overall perspective view of a second alternate embodiment of the personal carrier-mounted dog leash according to the present invention, showing the clamp mounted on the bracket's shorter U-shaped channel section, the latter being attached by itself to the frame of a first power chair.
Figure 13:
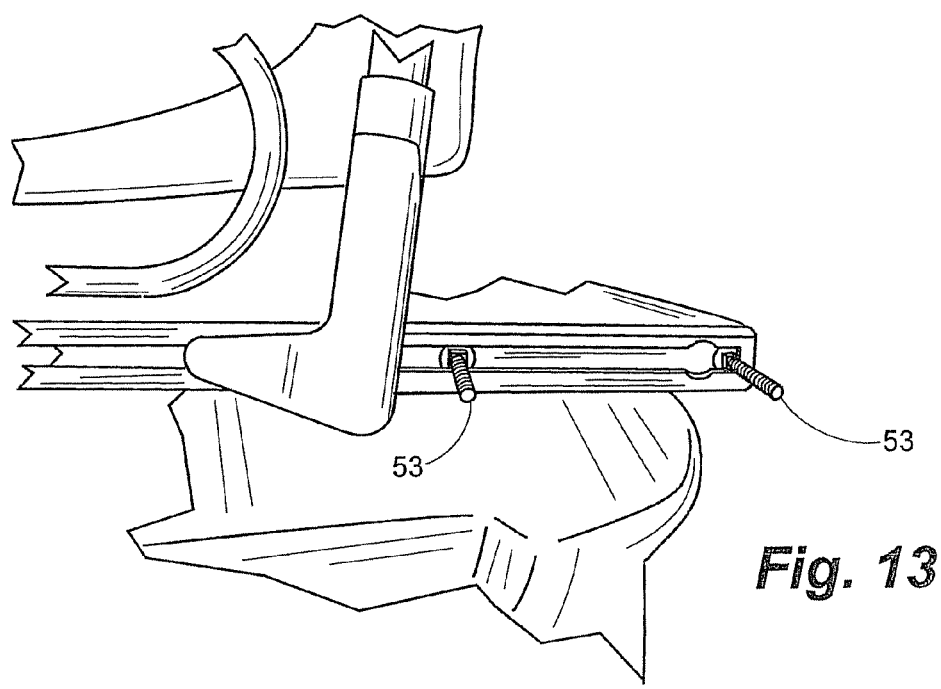
FIG. 13 is a perspective view, on an enlarged scale, of a pair of bolts mounted in position for receiving the shorter U-shaped channel section when the dog leash according to FIG. 12 is mounted on the first power chair, the latter including, under its seat, an open channel member, only a fragment of which is shown, whose slot is so sized that the bolt heads can be slip-fitted into it.

In a second alternate embodiment of the leash, shown in FIGS. 12-13 and indicated generally by the reference number 50, the clamp 20 is mounted on the shorter U-shaped channel section 42 by itself; and the latter is affixed to the carrier's frame with the use of bolts 53. As a consequence, the mounting structure for the leash 50 protrudes rearwardly of the personal carrier a much shorter distance than it does in the case of the leash 30. With the leash 50, which is preferably deployed on power chairs and the like which have an unusually short turning radius, the operator of such a power chair has substantially less chance of knocking the clamp's rearwardly protruding mounting structure into a wall, for example, as he turns the power chair about, than would be the case if the longer channel section 41, which measures, by way of example, about 51 cm (20 inches) in length, were also incorporated into the leash 50.

As an aid for the wheelchair-bound, and especially those persons who must rely at times on the assistance of a dog, the leash 30 offers many people a chance to increase their measure of independence as they attempt to perform a wide variety of tasks. Indeed, a dog tethered with the leash 30 to a manual wheelchair has been successfully trained to assist its occupant to move about, even when that individual, confined to such a wheelchair, would otherwise be virtually immobilized because of his having lost the use of one arm.

A very short learning curve is what a typical dog encounters as he is being trained to move about whether he is tethered by the leash 30 to his master's wheelchair or some other personal mobility device (PMD). Largely because the stiffener 18 and clip 17 ride attached to the dog's collar or harness without slapping or flopping around randomly so as to confuse the animal, the leash can transmit nonverbal communication free of extraneous signals between the PMD user and the tethered animal. The leash's capacity to transmit this enhanced nonverbal communication not only makes the dog's very short learning curve possible but also adds to the ease with which a PMD user can spend more time, as well as share a greater variety of tasks, with his or her dog.

Retrofitting most, if not all, manual wheelchairs to include the leash 30 can be accomplished without the use of tools. Rather, the universal mounting bracket's U-shaped channel sections 41, 42, once their respective cutouts 49, 46 have been aligned with each other, are simply clamped onto one side of the wheelchair downwardly of its main axle support with the use of carriage bolts 45 and hand tightened nuts 48. Not only are the bolts 45 and nuts 48 used to hold the bracket 40 on the wheelchair's frame but also they compensate for variations in the sizes and shapes of wheelchair frames which are generally made of a tubular structure and may be either circular or square in transverse cross-section. The specific sites, on a typical wheelchair, where the channel sections 41, 42 can be so clamped, are those at which the frame bends upwardly or otherwise rigidly connects horizontally disposed structural members supporting the chair's front wheels to those supporting the back of its seat (FIGS. 6-8). Among the latter structural members is one against which the U-shaped channel sections' flanges are pressed when part of it, sandwiched between them, occupies space created by the aligned cutouts 49, 46.

Figure 14:
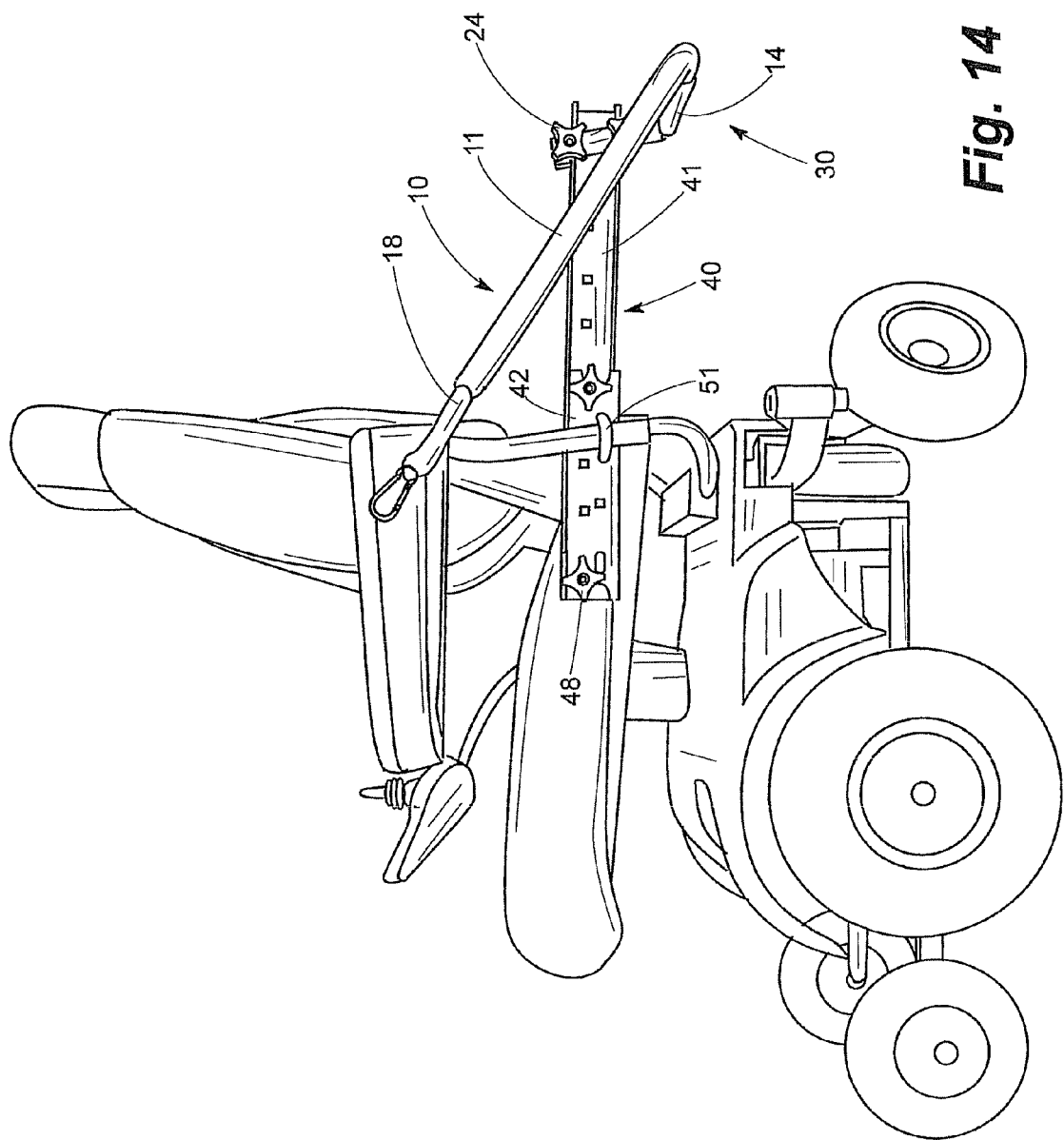
FIG. 14 is a side perspective view of the first alternate embodiment of the dog leash according to FIG. 6, the dog leash being shown with the bracket attached, with the use of an U-bolt, to the armrest support of a second power chair.
Figure 15:
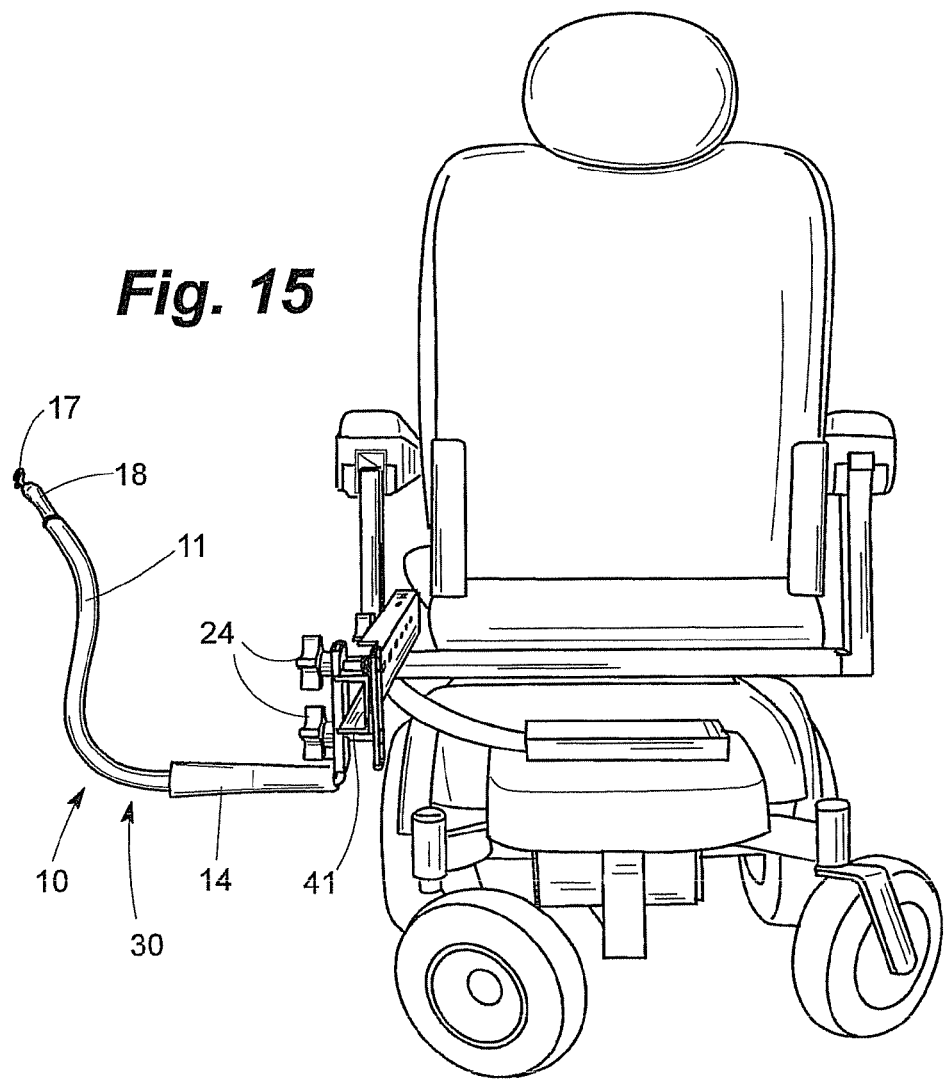
FIG. 15 is a rear perspective view, on a reduced scale, of the dog leash according to FIG. 14.

Retrofitting a power chair to include the leash 30 can be accomplished in a variety of ways without modifying the chair's frame. In the case of the Yazzy Model No. 1143 power chair, the shorter channel section 42 is first fixedly attached to the chair's armrest support with the use of U-bolt 51; and then the longer channel section 41 is affixed to the shorter channel section (FIGS. 14-16). Alternately, the bracket 40 can be clamped directly onto a square tube accessory mount (not shown) situated at the back of the chair's seat.

In the case of the Yazzy Model No. 1122 power chair, an open channel, provided by the original equipment manufacturer so that one can adjust the distance between the seat and footrest, can be used to fixedly attach the shorter channel section 42 to this power chair's frame. Specifically, this open channel defines a slot which is of the right size for receiving the heads of carriage bolts 53 onto which the shorter channel section 42 can be mounted, once the bolt heads have been slip-fitted into this slot and are being held in place there (FIGS. 12-13). Similarly, the leash 30 can be mounted on the frame of other power chairs by attaching one or both of the channel sections 41, 42 thereto, in accordance with the approaches illustrated herein for the Yazzy Model Nos. 1122 and 1143.

In the case of a power chair for shopping, such as the Lark EZ Shopper™, the universal mounting bracket's channel sections 41, 42, once their respective cutouts 43, 44 have been aligned with each other, are simply clamped over the chair's round formed seat frame (FIG. 17). The latter, only a part of which is actually clamped between the edges of the U-shaped channel sections' flanges, extends upwardly through the opening formed in the bracket 40 by the aligned cutouts 43, 44. Cutouts 54, 56 defined by the shorter channel section's web, when lined up with a bend in the chair's bumper, can be used to keep the bracket 40 from rotating.

Figure 18:
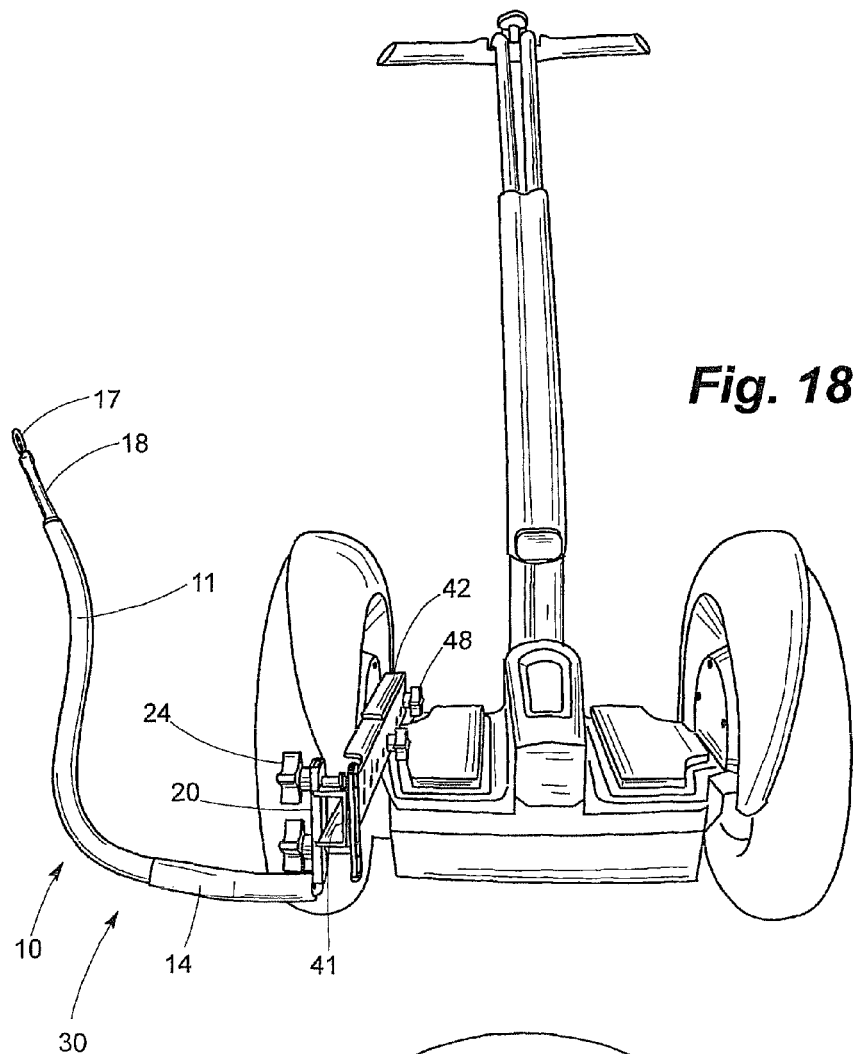
FIG. 18 is a rear perspective view of the first alternate embodiment of the dog leash according to FIG. 6, showing the bracket attached to the fender of an off-road Segway® personal mobility device.
Figure 19:
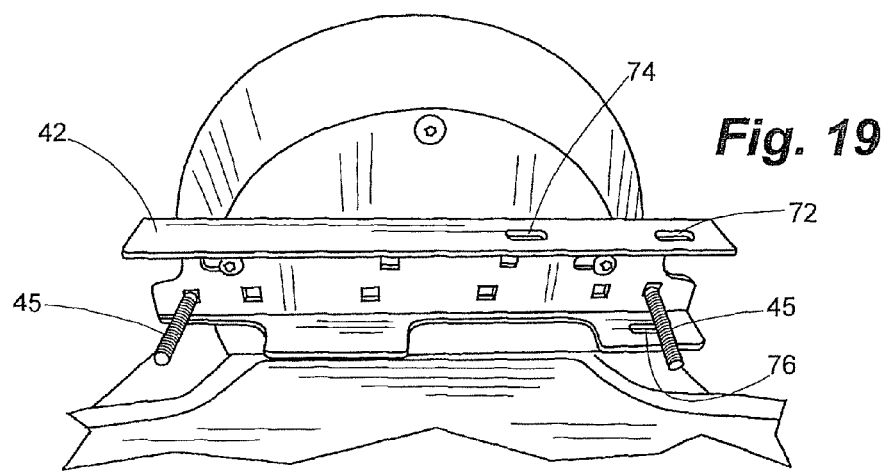
FIG. 19 is a side perspective view, on an enlarged scale, of the shorter U-shaped channel section used in attaching the dog leash according to FIG. 18 to the fender of the personal mobility device, with fragments of the latter being shown.

Retrofitting an off-road Segway® with a leash 30 so that one can enjoy rapid standing transportation while exercising a dog tethered to this personal mobility device can also be accomplished easily. The initial step entails attaching the shorter channel section 42 to one of its fenders using bolts 45 threadedly engageable with holes located on the original, unmodified fenders of the Segway® as supplied by its manufacturer. The longer channel section 41 is then affixed to the shorter one, completing the retrofit (FIGS. 18 and 19).

Figure 20:
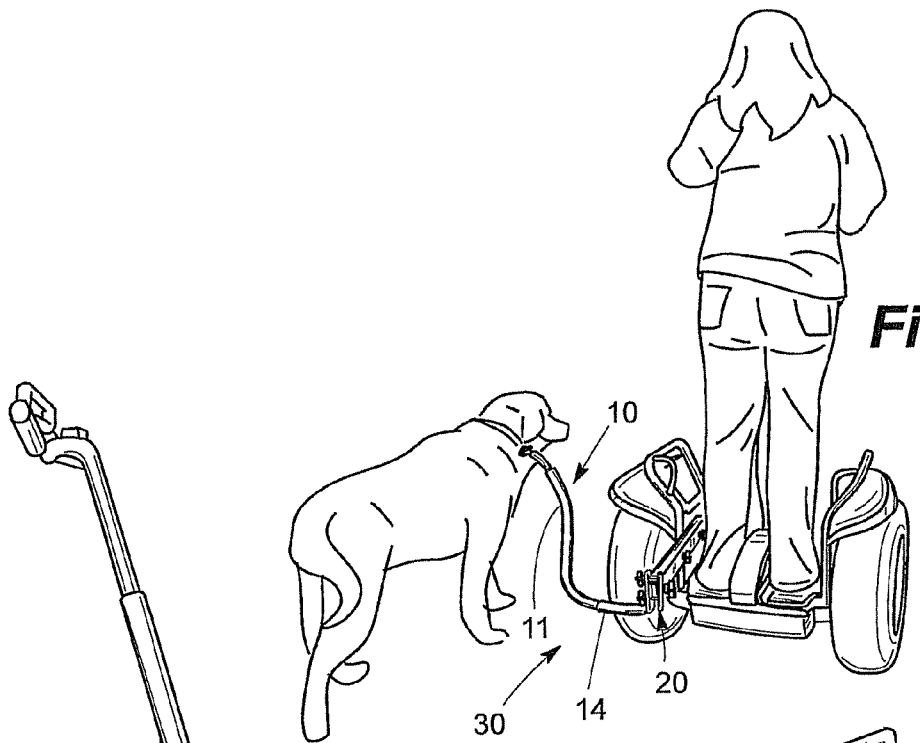
FIG. 20 is a rear perspective view of the first alternate embodiment of the dog leash according to FIG. 6, showing the bracket attached to the transmission cover of an on-road Segway® personal mobility device.
Figure 21:
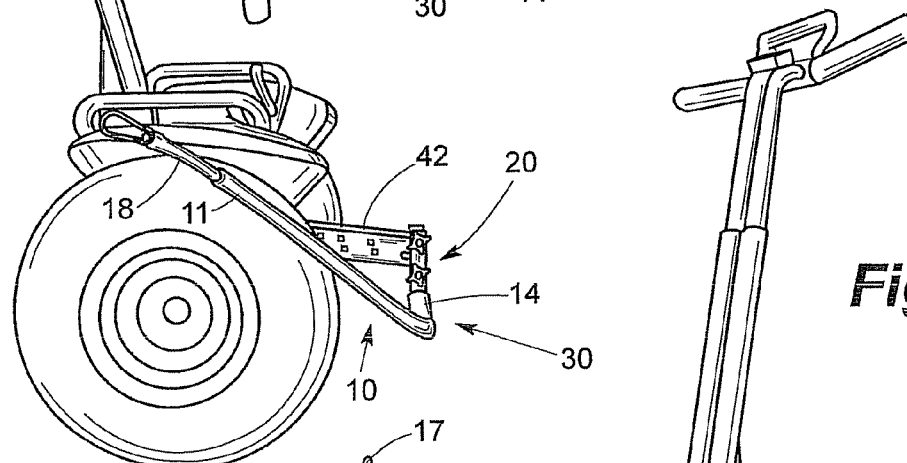
FIG. 21 is a rear perspective view, on an enlarged scale, of the dog leash according to FIG. 20.

For the on-road Segway®, on the other hand, the longer channel section 41 is bolted directly to its transmission cover, at a location provided by Segway® for attaching miscellaneous accessories. Next the bracket 40 is closed by attaching the shorter channel section 42 to the aft end of section 41; and the clamp 20 is mounted thereon (FIGS. 20-22). For both Segway® models, the bracket 40 serves a dual purpose of not only spacing the tethered dog in the heel position but also keeping him spaced to the side as well, so that he cannot get in front of the Segway® wheels.

The versatility of the bracket 40 is further evidenced by the way in which the leash 30 can be retrofitted onto an adult tricycle, such as the 24 inch wheel Sun Hand Trike or the Worksman Porta Trike 20, both of which have a similar support structure for their respective rear axles. In either case, the bracket's channel sections 41, 42 are first clamped together and then attached, with the use of U-bolt 52, as a unit to the tricycle's rear axle support structure (FIGS. 23-24).

What is claimed is:

1. In an apparatus for tethering a dog to a personal carrier, the apparatus including a mounting structure, a flexible coupling, a rigid, semi S-shaped mast, and a clip with a base, the clip defining at least one open loop and being secured, during use, to the dog's collar or harness, the mounting structure having at least one ear-like member which protrudes outwardly when the mounting structure is affixed to the carrier's frame, the flexible coupling, which is juxtaposed between the mounting structure and the mast's inner end and fixedly attached to both of them, connecting the mast to the ear-like member in such a way that the mast extends outwardly from the carrier's frame and arches generally upwardly, the mast being movable, in the forward and aft directions, about the ear-like member, wherein the improvement comprises:
    (a) a stiffener which protrudes outwardly from the mast's outer end; and
    (b) means, including an elongated cord connected to the mounting structure, for mooring the stiffener within the mast's outer end, a portion of the elongated cord defining a leading segment in which the cord is both threaded through the clip's open loop and doubled back on itself, the stiffener comprising the leading segment and a resilient plastic sheath, the plastic sheath, which is shrinkfitted onto the leading segment and the clip's base, encasing them in such a way that the clip's base cannot move from side to side independently of the leading segment, thereby virtually eliminating rattles and other dog-distracting chatter emanating from the clip and potentially set in motion by the tethered dog's own exertions.

2. The improvement in the dog-tethering apparatus according to claim 1, wherein the stiffener is further characterized as being stiff enough that it retains whatever shape into which it has been bent until the stiffener is acted upon by forces which are at least as great in magnitude as those exerted by a tethered dog in the process of lowering his head, and wherein the stiffener is still further characterized as being sufficiently flexible that the stiffener bends first, ahead of the flexible coupling and its juncture with the mast, so that the position of the mast's outer end, once set for a particular dog, can be maintained during normal use.

3. The improvement in the dog-tethering apparatus according to claim 1, wherein the stiffener is further characterized as protruding outwardly from the mast's outer end, when the stiffener is free of bends, a distance of up to 25.4 cm (10 inches) in length, the extent of the stiffener's outward protrusion being adjustable downwardly to a minimum length of about 7.6 cm (3 inches).

4. The improvement in the dog-tethering apparatus according to claim 3, wherein the clip includes a hook which is fixed in position with respect to the clip's base, so that the extent to which the stiffener protrudes outwardly from the mast's outer end can be shortened by repeatedly twisting the stiffener, while simultaneously twisting the cord, and can then be kept thus shortened by attaching the clip to the tethered dog's collar or harness.

5. The improvement in the dog-tethering apparatus according to claim 1, wherein the mounting structure comprises both a clamp and a universal mounting bracket having at least one channel section which is U-shaped in transverse cross-section, as well as means for fixedly attaching the U-shaped channel section to the carrier's frame in such a way that the longitudinal centerline of the channel section is disposed generally horizontally and the channel section's web is oriented perpendicularly to the horizontal plane, the clamp including first and second mating elements which, in assembled relation with the universal mounting bracket, are pressed against the web and against edges of the channel section's flanges, respectively, each of said edges being spaced apart from the web by the width of the flange along which the edge itself extends, the clamp being mounted proximate with the distal end of the channel section, so that the clamp can be spaced apart from the carrier's wheels.

6. In an apparatus for tethering a dog to a personal carrier, the apparatus including a device with a hollow, rigid, semi S-shaped mast, the device being mountable onto the carrier's frame in such a way that the hollow mast projects outwardly therefrom, and a clip with a base, the clip defining at least one open loop and being secured, during use, to a dog's collar or harness, wherein the improvement comprises:
    (a) a stiffener which protrudes outwardly from the mast's outer end; and
    (b) means, including at least one cord held within the mast, for mooring the stiffener within the mast's outer end, distal ends of the cord being connected to said device and to the stiffener, respectively, a portion of the cord defining a leading segment which is threaded, prior to use, through the clip's open loop, the stiffener comprising the leading segment and a resilient plastic sheath in which both the leading segment and the clip's base are encased, the clip's base, when so encased, being immobilized such that it cannot move from side to side independently of the leading segment, thereby virtually eliminating dog-distracting chatter emanating from the clip and potentially set in motion by the tethered dog's own exertions.

7. In an apparatus for tethering a dog to a personal carrier, the apparatus including a device with an open ended, elongated mast, and a flexible coupling attached thereto, the device being mountable onto the carrier's frame in such a way that the mast projects outwardly from its juncture with the flexible coupling, the flexible coupling being sufficiently flexible to protect the dog from sudden jerks, the apparatus further including a clip with a base, the clip being secured, during use, to a dog's collar or harness, wherein the improvement comprises:

(a) a stiffener which protrudes outwardly from the mast's outer end; and (b) means, including at least one cord held within the mast and connected to said device, for mooring the stiffener within the mast's outer end, a portion of the cord defining a leading segment, which is connected to the clip's base, the stiffener comprising the leading segment and a resilient plastic sheath in which both the leading segment and the clip's base are encased so as to immobilize the base with respect to the end of the leading segment contiguous with it, the sheath and the leading segment together forming a bendable, built-up span, the distal ends of the span being disposed contiguous with the clip and with the mast's outer end, respectively, the built-up span bending first, ahead of the flexible coupling and its juncture with the mast, so that the position of the mast's outer end, once set for a particular dog, can be maintained during normal use.

8. The improvement in the dog-tethering apparatus according to claim 7, wherein the mast is further characterized as being semi S-shaped and the stiffener as being sufficiently stiff that it retains whatever shape into which it has been bent until the stiffener is acted upon by forces which are at least as great in magnitude as those exerted by a tethred dog in the process of lowering his head.

9. The improvement in the dog-tethering apparatus according to claim 7, further comprising a mounting structure including both a clamp and a universal mounting bracket, the clamp being connected to the flexible coupling, the mounting bracket having a pair of first and second channel sections, each channel section being U-shaped in transverse cross-section, the first and second channel sections each having paired flanges and defining first and second cutouts, respectively, which are disposed contiguous with the end of one of said paired flanges in each of the channel sections; means for fastening the first and second channel sections together in such a way that when their respective flanges defining the first and second cutouts overlap, the first cutout is aligned with the second cutout, creating an open space, the fastening means pressing the flanges which define the first and second cutouts against a portion of the carrier's frame, when said portion is held within the open space, in such a way that the longitudinal centerline of each channel section is disposed generally horizontally and each channel section's web is oriented perpendicularly to the horizontal plane, the clamp including first and second mating elements which, in assembled relation with the universal mounting bracket, are pressed together, sandwiching in the aft end of at least one of the U-shaped channel sections in between said elements.

10. The improvement in the dog-tethering apparatus according to claim 7, further comprising a mounting structure including both a clamp and a universal mounting bracket, the clamp being connected to the flexible coupling, the mounting bracket having a pair of first and second channel sections, each channel section being U-shaped in transverse cross-section, the first and second channel sections each having paired flanges and defining first and second cutouts, respectively, the first cut out being disposed proximate with the midsection of one of said paired flanges in the first channel section; means for fastening the first and second channel sections together in such a way that when their respective flanges defining the first and second cutouts overlap, the first cutout is aligned with the second cutout, creating an open space, the fastening means pressing the flanges which define the first and second cutouts against a portion of the carrier's frame, when said portion is held within the open space, in such a way that the longitudinal centerline of each channel section is disposed generally horizontally and each channel section's web is oriented perpendicularly to the horizontal plane, the clamp including first and second mating elements which, in assembled relation with the universal mounting bracket, are pressed together, sandwiching in the aft end of at least one of the U-shaped channel sections between said elements.

11. The improvement in the dog-tethering apparatus according to claim 7, further comprising a mounting structure including both a clamp and a universal mounting bracket, the clamp being connected to the flexible coupling, the mounting bracket having a pair of first and second channel sections which are unequal in length, each channel section being U-shaped in transverse cross-section, and the mounting structure also having means, including at least one U-bolt, for fixedly attaching the first channel section to the carrier's frame in such a way that the longitudinal centerline of the first channel section is disposed generally horizontally and the first channel section's web is oriented perpendicularly to the horizontal plane, the first and second channel sections being held together, in assembled relation, so that they face one another; the clamp including first and second mating elements which, in use, are pressed together, sandwiching in the aft end of at least one of the channel sections between said elements.

12. The improvement in the dog-tethering apparatus according to claim 7, further comprising a mounting structure including both a clamp and a universal mounting bracket, the clamp being connected to the flexible coupling, the mounting bracket having a pair of first and second channel sections which are unequal in length, each channel section being U-shaped in transverse cross-section; the mounting structure also having means, including a pair of bolts, for fixedly attaching the first channel section to the carrier's frame in such a way that the longitudinal centerline of the first channel section is disposed generally horizontally and the first channel section's web is oriented perpendicularly to the horizontal plane, the first and second channel sections being held together, in assembled relation, facing one another; the clamp including first and second mating elements which in use, are pressed together, sandwiching in the aft end of at least one of the channel sections between said elements.

13. The improvement in the dog-tethering apparatus according to claim 12, wherein the first channel section is the shorter channel section.

14. The improvement in the dog-tethering apparatus according to claim 12, wherein the first channel section is the longer channel section.

15. The improvement in the dog-tethering apparatus according to claim 7, further comprising a mounting structure including both a clamp and a universal mounting bracket, the clamp being connected to the flexible coupling, the mounting bracket having a pair of channel sections, each channel section being U-shaped in transverse cross-section; the channel sections being fastened together as a unit in which they face one another; the mounting structure also having means, including a U-bolt, for fixedly attaching the channel sections as a unit to the carrier's frame in such a way that their longitudinal centerlines are disposed generally horizontally and their webs are oriented perpendicularly to the horizontal plane; the clamp including first and second mating elements which, in use, are pressed together, sandwiching in the aft end of at least one of the channel sections between said elements.

16. The improvement in the dog-tethering apparatus according to claim 7, further comprising a mounting structure including both a clamp and a universal mounting bracket, the clamp being connected to the flexible coupling, the bracket being mountable onto a conventional wheelchair's main frame proximate with a horizontally disposed structure therein supporting the wheelchair's footrests, the bracket, when mounted onto said main frame, extending apart from the wheelchair's rear wheels; the clamp being attached, in use, to the distal end of the bracket.

17. The improvement in the dog-tethering apparatus according to claim 7, further comprising a mounting structure including both a clamp and a universal mounting bracket, the clamp being connected to the flexible coupling, the bracket being mountable onto the seat frame of a typical power chair, the bracket, when mounted onto said seat frame, extending rearwardly, aft of the chair's rear wheels; the clamp being attached, in use, to the aft end of the bracket.

18. The improvement in the dog-tethering apparatus according to claim 7, further comprising a mounting structure including both a clamp and a universal mounting bracket, the clamp being connected to the flexible coupling, the bracket being mountable onto the seat frame of a powered shopping cart, the bracket, when mounted onto said seat frame, extending rearwardly, aft of the cart's rear wheels; the clamp being attached, in use, to the aft end of the bracket.

19. The improvement in the dog-tethering apparatus according to claim 7, further comprising a mounting structure including both a clamp and a universal mounting bracket, the clamp being connected to the flexible coupling, the bracket being mountable onto the transmission cover of a personal mobility device, the bracket, when mounted onto said transmission cover, extending rearwardly, aft of the personal mobility device's wheels; the clamp being attached, in use, to the aft end of the bracket.

20. The improvement in the dog-tethering apparatus according to claim 7, further comprising a mounting structure including both a clamp and a universal mounting bracket, the clamp being connected to the flexible coupling, the bracket being mountable onto at least one of the fenders of a personal mobility device, the bracket, when mounted onto said fender, extending rearwardly, aft of the personal mobility device's wheels: the clamp being attached, in use, to the aft end of the bracket.

21. The improvement in the dog-tethering apparatus according to claim 7, further comprising a mounting structure including both a clamp a universal mounting bracket, the clamp being connected to the flexible coupling, the bracket being mountable on the rear axle frame of a typical adult tricycle, the bracket, when mounted onto said rear axle frame, extending rearwardly, aft of the tricycle's rear wheels; the clamp being attached, in use, to the aft end of the bracket.

22. The improvement in the dog-tethering apparatus according to claim 7, further comprising a clamp which is connected to the flexible coupling, the clamp being mountable on the rear wheel frame of a bicycle.

* * * * *